(12) United States Patent
Hisatsune et al.

(10) Patent No.: US 11,681,682 B2
(45) Date of Patent: Jun. 20, 2023

(54) DATA PROCESSING SYSTEM AND CACHE UPDATE CONTROL METHOD

(71) Applicant: Hitachi, Ltd., Tokyo (JP)

(72) Inventors: Taichi Hisatsune, Tokyo (JP); Shinichiro Saito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/541,970

(22) Filed: Dec. 3, 2021

(65) Prior Publication Data

US 2022/0179839 A1   Jun. 9, 2022

(30) Foreign Application Priority Data

Dec. 4, 2020   (JP) .............................. JP2020-202171

(51) Int. Cl.
*G06F 16/23* (2019.01)
*G06F 16/21* (2019.01)

(52) U.S. Cl.
CPC ............ *G06F 16/23* (2019.01); *G06F 16/211* (2019.01)

(58) Field of Classification Search
CPC .... G06F 16/23; G06F 16/211; G06F 16/2358; G06F 16/2365; G06F 16/24552
USPC ......................................................... 707/609
See application file for complete search history.

(56) References Cited

U.S. PATENT DOCUMENTS

| | | | |
|---|---|---|---|
| 10,169,446 B1 * | 1/2019 | Garlapati | G06F 16/284 |
| 2002/0091702 A1 * | 7/2002 | Mullins | G06F 16/25 |
| 2016/0217193 A1 * | 7/2016 | Fakeih | G06F 16/2462 |
| 2019/0188609 A1 * | 6/2019 | Hobt | G06F 12/0802 |

FOREIGN PATENT DOCUMENTS

JP   2012-146076 A   8/2012

* cited by examiner

*Primary Examiner* — Kuen S Lu
(74) *Attorney, Agent, or Firm* — Volpe Koenig

(57) ABSTRACT

A data processing system includes an analysis part cache that caches data of a database, a data processing development module that is used by a developer and develops analysis processing for data analysis, a data processing module that is used by the developer and performs data analysis by executing analysis processing, a cache management module that sets an update constraint input from a DB administrator regarding cache update from the database in the analysis part cache, and an update determination module that determines whether or not cache update is possible based on the update constraint, and when cache update is requested, the update determination module executes the requested cache update if cache update is possible in the determination.

9 Claims, 28 Drawing Sheets

FIG. 10

```
if( match_limitation(date(), Client, Client.db.limitation)){
    Client.sendmsg(db);
}
```

```
function match_limitation( date, client, limitation){
  if( date > limitation.from && date < limitation.to){
    if( client.schema == limitation.schema ){
    return 1;
      }
  }
  return 0;
}
```

FIG. 11

```
Client.connection({
  host: db.host,
  port: db.port,
  database: db.dbname,
  user: db.user,
  password: db.pass
});
```

```
Client.execute({
  query: 'SHOW TABLES;',
  schema: 'public'
});
```

FIG. 12

[UPDATE LOG]

| Query Log | | |
|---|---|---|
| [SUCCESS] | 2020/09/15 14:15 | SELECT QUERY TO public SCHEMA OF Factory-C HAS BEEN TRANSMITTED, AND LATEST DATA HAVE BEEN ACQUIRED. |
| [SUCCESS] | 2020/09/15 16:17 | ALL SCHEMAS OF Factory-C HAVE BEEN UPDATED. |
| [SUCCESS] | 2020/09/17 13:33 | ALL TABLES OF public SCHEMA OF Factory-C HAVE BEEN UPDATED. |

[REGISTRATION DB LIST SCREEN]

| host | port | DB name | user | pass | CONSTRAINT | LOG |
|---|---|---|---|---|---|---|
| localhost | 5432 | Factory-Line-A | admin | ***** | 0 O'CLOCK TO 12 O'CLOCK: NO CONSTRAINT<br>12 O'CLOCK TO 24 O'CLOCK: 1/1h | 11:11 [schema] UPDATE<br>11:12 [table:shop] UPDATE<br>12:10 [schema] UPDATE REJECTED |
| 192.2.22.2 | 5351 | Factory-Line-B | admin | ********* | schema: public<br>8 O'CLOCK TO 17 O'CLOCK: INACCESSIBLE | 12:22 [schema,table] UPDATE<br>12:33 [table:review] UPDATE REJECTED |
| | | | | | | |
| | | | | | | |

FIG. 18

[DB INFORMATION INPUT SCREEN] — 360

| | | |
|---|---|---|
| host | localhost | 361 |
| port | 5432 | 362 |
| Database Name | Factory_line-A | 363 |
| user | admin | 364 |
| password | ******* | 365 |

[CACHE UPDATE CONSTRAINT INPUT SCREEN] — 370

TARGET SCHEMA  ALL — 371

☐ IMMEDIATELY UPDATABLE — 372

373:
- [0] O'CLOCK TO [8] O'CLOCK — UNLIMITED
- [8] O'CLOCK TO [12] O'CLOCK — INACCESSIBLE
- [12] O'CLOCK TO [17] O'CLOCK — ONCE PER HOUR ONLY
- [17] O'CLOCK TO [24] O'CLOCK — SHOW TABLES ONLY

OK — 374

[DB SPECIFICATION SCREEN] 390

- CONNECTION DB — 391 (Factory-A, Factory-B, Factory-C)
- QUERY — 392: SELECT * FROM public;
- SCHEMA — 393: public
- TABLE — 394: Machine-1C3
- 395, 117: UPDATE SCHEMA
- 396, 117: UPDATE TABLE
- 397: TRANSMIT QUERY

[DB DATA DISPLAY SCREEN] 400

Database: Database_01   Schema: public   Table: shop

| ID | name | x | y | address |
|---|---|---|---|---|
| 1 | A burger | 1341.132 | 23.41 | XXX |
| 2 | B shop | 1331.21 | 23.21 | YYY |
| 3 | C noodles | 1234.123 | 25.51 | ZZZ |
| 4 | ... | ... | ... | ... |

401

DATA PROCESSING SYSTEM AND CACHE UPDATE CONTROL METHOD

BACKGROUND OF THE INVENTION

1. Field of the Invention

The present invention relates to a data processing system and a cache update control method, and is suitably applied to a data processing system and a cache update control method for managing update of a cache used for database analysis.

2. Description of the Related Art

In recent years, in manufacturing factories, data analysis utilization has been advanced in which new values are generated by analyzing data such as sensor data and log data stored in a core database. In this data analysis, a data analyst performs analysis with reference to data of a core database, thereby improving production efficiency and visualizing.

In implementation of general data analysis, first, analysis target data is selected, and after a development phase for improving the efficiency of data analysis, transition is made to an operation phase in which data analysis is performed by periodical database reference and analysis. Among them, in the development phase, since various data on the database are reviewed by trial and error, a load occurs due to frequent access to the database. On the other hand, since the main role of the core database is to store the operation log data, it is desirable to reduce inadvertent data access that interferes with storage processing of the operation log data.

Note that, in the development phase of conventional data analysis, access to a database by a specialized data analyst was made under waterfall type management monitoring, so that access was planned and there was no inadvertent load. However, in recent years, as a result of setting up of an environment in which many non-specialized users can easily handle data analysis due to the trend of the democratization of analytics, many inadvertent access loads to database are generated due to data analysis that is not managed and monitored.

It is generally known that a cache is effective in order to reduce a load on a database. This is to temporarily store data necessary for data analysis as a cache, and refer to the cache at the time of analysis to prevent access to the database every time the analysis is performed.

Regarding update of cache data, for example, JP 2012 146076 A discloses a technique for reducing access to a master database. Specifically, JP 2012-146076 A discloses that "When there is a transmission request to cache data after the lapse of an update period, a state of an update flag associated with the cache data is determined" and that "If the update flag is off, the update flag is turned on, and update data corresponding to the cache data after the lapse of the update period are acquired".

SUMMARY OF THE INVENTION

Meanwhile, in the core database, there is a timing at which a load is not desired to be applied to the core database by the update even if the cache data is old cache data that should be originally updated. In the development phase of data analysis, changing to a cache of different data in the middle of analysis leads to failure to obtain a correct analysis result, and thus, it is necessary to avoid the change.

However, in the method described in JP 2012-146076 A described above, by giving an update flag to the cache data, when a cache after the lapse of the period is referred to, access to the database occurs at that timing, and the cache is updated. That is, the method described in JP 2012-146076 A has a problem that the request regarding cache management in the core database described above cannot be satisfied in a regard that update of the cache is automatic processing depending on the lapse of time, and the update timing cannot be controlled and the cache cannot be voluntarily updated.

The present invention has been made in view of the above regards, and is to propose a data processing system and a cache update control method that make a cache of a database updatable only under a planned constraint and can reduce a load due to access to the database.

In order to solve such a problem, the present invention provides a data processing system that is connected to a database and performs data analysis of the database, the data processing system including: an analysis part cache that caches data of the database referred to in a development phase of the data analysis; a data processing development module that is used by a developer of the data analysis and develops analysis processing for the data analysis; a data processing module that is used by the developer and performs data analysis by executing the analysis processing developed by the data processing development module; a cache management module that sets an update constraint that is input from an administrator of the database regarding a cache update from the database in the analysis part cache; and an update determination module that determines whether or not a cache update of the analysis part cache is possible based on the update constraint set by the cache management module, in which when the cache update is requested from the data processing development module, the update determination module executes the requested cache update in a case where a cache update is allowed in the determination.

In order to solve such a problem, the present invention provides a cache update control method by a data processing system that performs data analysis of a database, in which the data processing system includes: an analysis part cache that caches data of the database referred to in a development phase of the data analysis; a data processing development module that is used by a developer of the data analysis and develops analysis processing for the data analysis; a data processing module that is used by the developer and performs data analysis by executing the analysis processing developed by the data processing development module; a cache management module that sets an update constraint that is input from an administrator of the database regarding a cache update from the database in the analysis part cache; and an update determination module that determines whether or not a cache update of the analysis part cache is possible based on the update constraint set by the cache management module, and when the cache update is requested from the data processing development module, the update determination module executes the requested cache update in a case where a cache update is allowed in the determination.

According to the present invention, it is possible to make a cache of a database updatable only under a planned constraint and reduce a load due to access to the database.

BRIEF DESCRIPTION OF THE DRAWINGS

FIG. 10 is an example of a code for performing update determination;

FIG. 11 is a code example of a connection query;

FIG. 12 is a view illustrating an example of an update log 163;

FIG. 17 is a view illustrating an example of a registration DB list screen;

FIG. 18 is a view illustrating an example of a DB information input screen;

FIG. 19 is a view illustrating an example of a cache update constraint input screen;

DESCRIPTION OF THE PREFERRED EMBODIMENTS

Embodiments of the present invention will be described below with reference to the drawings.

(1) First Embodiment (1-1) Configuration

Figure 1:
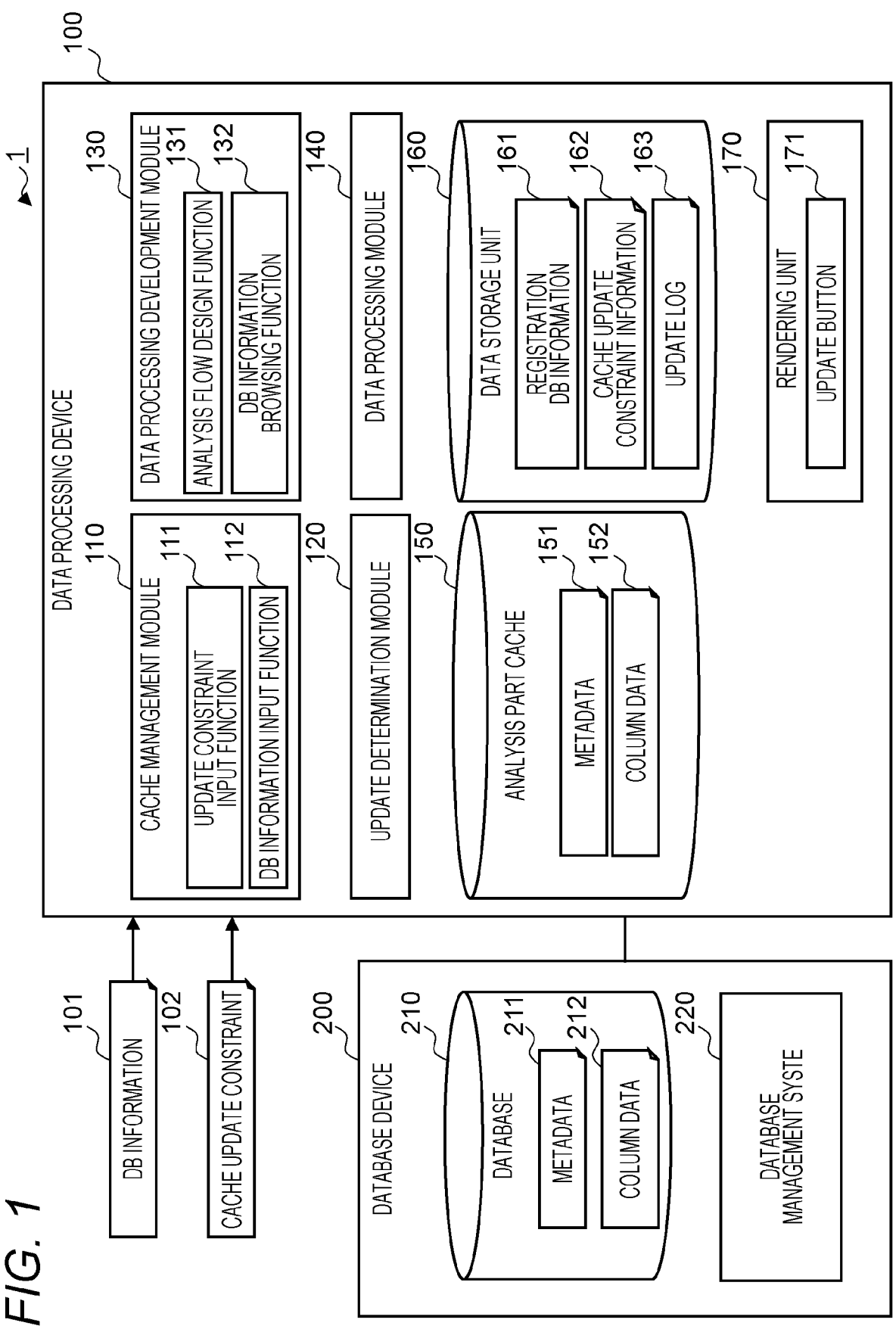
FIG. 1 is a block diagram illustrating a configuration example of a data processing system 1 according to a first embodiment of the present invention.

FIG. 1 is a block diagram illustrating a configuration example of the data processing system 1 according to the first embodiment of the present invention.

As illustrated in FIG. 1, the data processing system 1 according to the present embodiment is configured with one or more data processing devices 100 used by a data analysis developer (a developer 3 in FIG. 2 described later) that are connected to a database device 200 managed by a database administrator (a DB administrator 2 in FIG. 2 described later). Note that a detailed relationship among the data processing system 1, the DB administrator 2, and the developer 3 will be described later with reference to FIG. 2.

In FIG. 1, the DB information 101 is information of a database 210 given to the data processing device 100 by the DB administrator 2, and the cache update constraint 102 is a constraint imposed at the time of cache update, the constraint described by the DB administrator 2. The DB information 101 and the cache update constraint 102 are input to the data processing device 100 by the DB administrator 2.

The data processing device 100 includes a cache management module 110, the update determination module 120, a data processing development module 130, a data processing module 140, an analysis part cache 150, a data storage unit 160, and the rendering unit 170.

The cache management module 110 has the update constraint input function 111 that receives the cache update constraint 102, which is a constraint at the time of updating a cache, and the DB information input function 112 that receives the DB information 101 for connecting to the database 210, as functions of receiving input of information from the DB administrator 2 to the data processing device 100.

The update determination module 120 has a function of determining whether or not update is possible when there is an update request to the analysis part cache 150 with reference to cache update constraint information 162 in which the cache update constraint 102 received by the cache management module 110 is put together.

The data processing development module 130 has the analysis flow design function 131 and the DB information browsing function 132. The analysis flow design function 131 has a database reference method when performing data analysis, methods such as data coupling, separation, and analysis processing, a method of outputting an analysis result, and the like, and the developer 3 can perform data analysis by using these methods. The DB information browsing function 132 has a function of displaying information (the DB information 101) of the database 210 and providing an entry field of a database query when a method including connection to the database 210 is called by the analysis flow design function 131.

The data processing module 140 has a function of actually executing the analysis processing developed by the developer 3 with the data processing development module 130.

The analysis part cache 150 is a cache that stores data required for data analysis. As an example, in a relational database, metadata 151 such as a schema name, a table name, and a column name, and column data 152 in contents of a table are stored.

The data storage unit 160 stores registration DB information 161, the cache update constraint information 162, and the update log 163. The registration DB information 161 is information in which the DB information 101 received by the DB information input function 112 of the cache management module 110 is put together, and the cache update constraint information 162 is information in which the cache update constraint 102 received by the update constraint input function 111 of the cache management module 110 is put together. The update log 163 is information in which a log of cache update processing is stored.

The rendering unit 170 receives a user operation and displays functions and information of the cache management module 110 and the data processing development module 130. An update button 171 described later can be displayed on a display screen by the rendering unit 170. When the user performs a pressing operation on the update button 171 as necessary, a target cache of the analysis part cache 150 is updated.

The database device 200 includes the database 210 and a database management system 220. The database 210 stores factory operation data such as sensor data (sensor data 201 in FIG. 2 described later) and log data (log data 202 in FIG. 2 described later) as metadata 211 and column data 212. Access to the database 210 and the like are managed by the database management system 220.

In the present embodiment, it will be described that, using the data processing system 1 configured as described above, the DB administrator 2 imposes a constraint of cache update on the analysis part cache 150 of the data processing device 100, and the developer 3 operates the update button 171 under the constraint described above, whereby the analysis part cache 150 can be arbitrarily updated under the constraint described above. However, the present invention is not limited to such an embodiment, and the specific configuration thereof can be changed without departing from the idea or gist of the present invention.

In the present embodiment, for example, an administrator (or a management department) of a core database and a developer of data analysis can be assumed as users of the data processing system 1 illustrated in FIG. 1.

Figure 2:
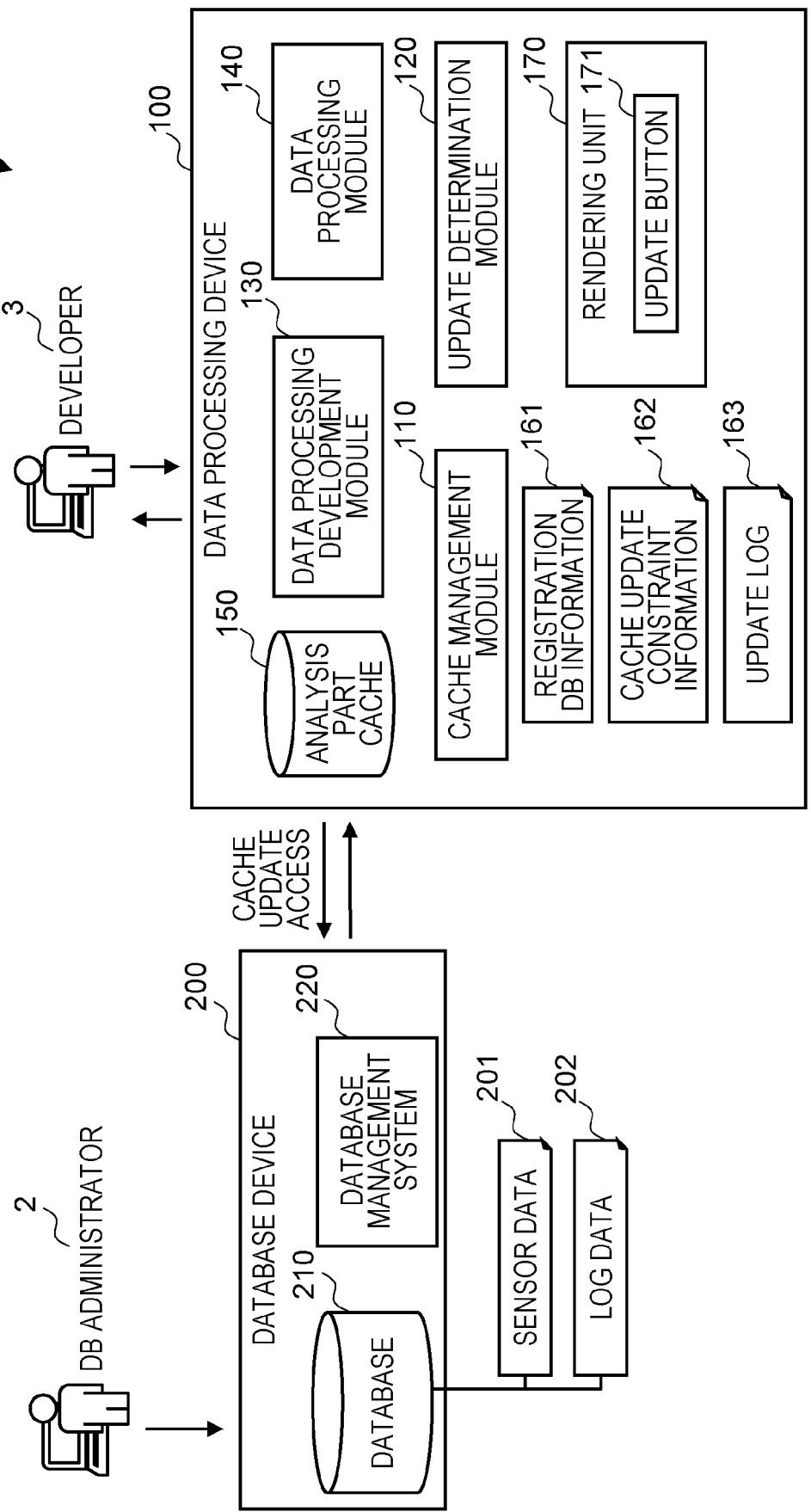
FIG. 2 is a view for explaining a relationship between the data processing system 1 and a user.

FIG. 2 is a view for explaining the relationship between the data processing system 1 and the user. As the users of the data processing system 1 according to the present embodiment, a database administrator (the DB administrator 2) and a data analysis developer (the developer 3) are assumed. In FIG. 2, illustration of a part of the configuration of the data processing system 1 illustrated in FIG. 1 is omitted.

As illustrated in FIG. 2, the DB administrator 2 manages the database 210 in the database device 200 that stores the sensor data 201 and the log data 202. The developer 3 operates the data processing development module 130 in the data processing device 100 through the rendering unit 170 to design a data processing flow. The processing flow designed by the developer 3 is actually processed by the data processing module 140. Between the data processing device 100 and the database device 200, update of the analysis part cache 150 and access of data reference occur. Here, it is assumed that in order for the developer 3 to access the database 210 on the data processing device 100, it is necessary for the DB administrator 2 to give an access authority to the data processing device 100 and provide the DB information 101 (specifically, host, port number, user, password, and so on), and the developer 3 cannot perform an action of accessing the database 210 and referencing without permission by the DB administrator 2.

(1-2) Overall Processing

Hereinafter, the cache update constraint registration processing and the arbitrary cache update processing will be described as the overall processing executed by the data processing system 1.

Figure 3:
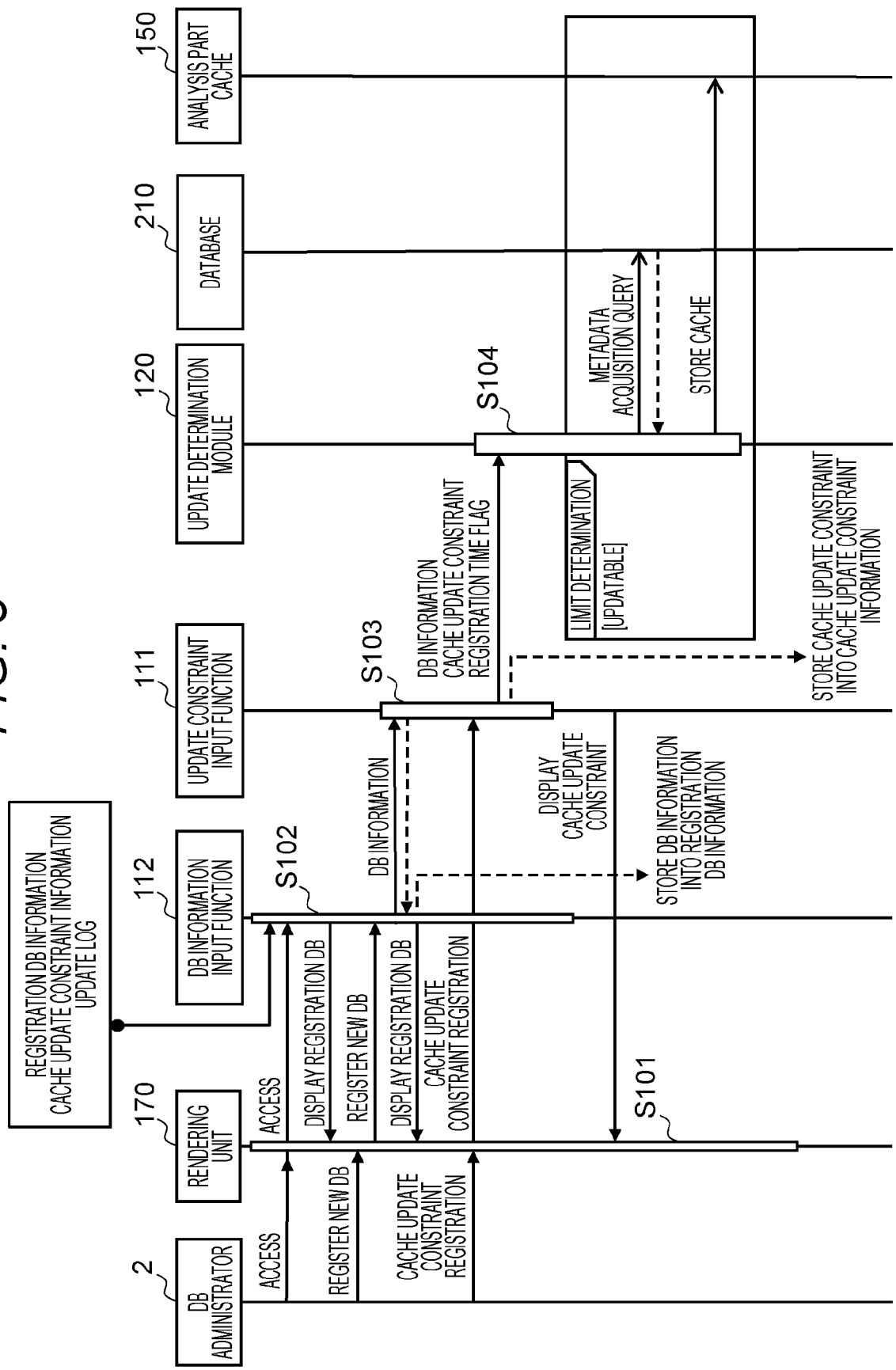
FIG. 3 is a sequence diagram illustrating a procedure example of cache update constraint registration processing.

FIG. 3 is a sequence diagram illustrating a procedure example of the cache update constraint registration processing. The series of processing illustrated in FIG. 3 is processing executed by the data processing system 1 when the DB administrator 2 gives the DB information 101 of the database 210 and the cache update constraint 102 to the data processing device 100 so that the developer 3 can access the database 210 on the data processing device 100. Note that the series of processing illustrated in FIG. 3 is assumed to be executed before data analysis by the developer 3.

In the sequence diagram of FIG. 3, the series of processing continuously executed by the same function unit, module, or the like is denoted by step numbers, and the same is true to other sequence diagrams described later.

Step S101 illustrated in FIG. 3 is processing by the rendering unit 170. In step S101, when the DB administrator 2 accesses the cache management module 110, the rendering unit 170 first makes an access notification to the DB information input function 112. Then, the rendering unit 170 receives data regarding a registered database (at least the registration DB information 161 and the cache update constraint information 162) from the DB information input function 112 and displays the data. Thereafter, when information on a database to be newly registered (the DB information 101 for new registration) is input from the DB administrator 2, the rendering unit 170 passes the information to the DB information input function 112. Thereafter, the rendering unit 170 receives, from the DB information input function 112, the registration DB information 161 to which the previously passed DB information 101 for new registration is added, and displays the data. Next, when an input for registering the cache update constraint 102 is given from the DB administrator 2, the rendering unit 170 passes the cache update constraint 102 to the update constraint input function 111. Thereafter, the updated cache update constraint information 162 is received from the update constraint input function 111 and displayed.

Step S102 illustrated in FIG. 3 is processing by the DB information input function 112. In step S102, when receiving the access notification from the rendering unit 170, the DB information input function 112 acquires information on the current database 210 from the registration DB information 161 of the data storage unit 160, acquires the currently registered cache update constraint from the cache update constraint information 162 of the data storage unit 160, acquires a log of cache update from the update log 163 of the data storage unit 160, and transmits information on the registered database 210 to the rendering unit 170 based on these pieces of acquired information. Upon receiving the DB information 101 to be newly registered from the rendering unit 170, the DB information input function 112 passes the DB information 101 to the update constraint input function 111 to store it into the registration DB information 161.

Furthermore, the DB information input function 112 transmits the updated information on the registered database 210 to the rendering unit 170.

Step S103 illustrated in FIG. 3 is processing by the update constraint input function 111. In step S103, when receiving the DB information 101 to be newly registered from the DB information input function 112, the update constraint input function 111 waits for transmission of the cache update constraint 102 from the rendering unit 170. Then, when the cache update constraint 102 is input, the update constraint input function 111 passes the DB information 101, the cache update constraint 102, and the registration time flag to the update determination module 120. The registration time flag is a flag indicating that the transmission data has been transmitted at the time of registration. Then, the update constraint input function 111 stores the input cache update constraint 102 into the cache update constraint information 162, and transmits the updated cache update constraint information 162 to the rendering unit 170.

Step S104 illustrated in FIG. 3 is processing by the update determination module 120. In step S104, the update determination module 120 determines whether or not access to the database 210 is possible and cache update is possible based on the DB information 101, the cache update constraint 102, and a registration flag that have been received from the update constraint input function 111. If the registration flag is included in the received data (the update flag included in the update determination module 120 is ON) and the cache update is determined to be possible, the update determination module 120 transmits a metadata acquisition query to the database 210 and stores the metadata 211 received from the database 210 into the cache of the analysis part cache 150 (metadata 151).

By performing each processing of FIG. 3 as described above, the DB information 101 and the cache update constraint 102 for connecting to the database 210 input from the DB administrator 2 are given to the data processing device 100, and therefore the developer 3 can access the database 210 on the data processing device 100 thereafter.

Figure 4:
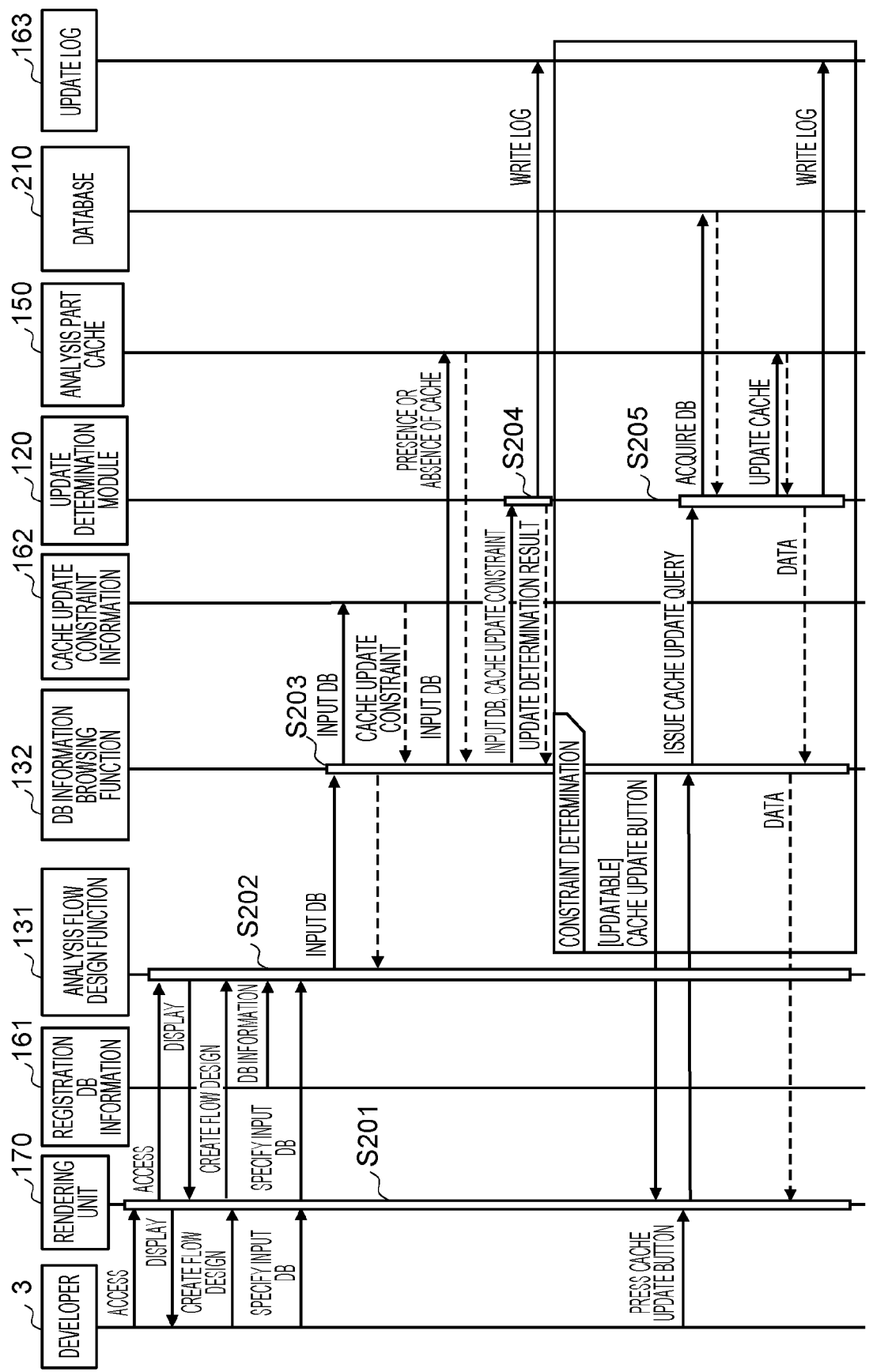
FIG. 4 is a sequence diagram illustrating a procedure example of arbitrary cache update processing.

FIG. 4 is a sequence diagram illustrating a procedure example of the arbitrary cache update processing. The series of processing illustrated in FIG. 4 is processing executed by the data processing system 1 when the developer 3 performs cache update of the analysis part cache 150 while using the analysis flow design function 131.

Step S201 illustrated in FIG. 4 is processing by the rendering unit 170. In step S201, when the developer 3 accesses the analysis flow design function 131, the rendering unit 170 makes an access notification to the analysis flow design function 131. Then, the rendering unit 170 receives information regarding the analysis flow being designed from the analysis flow design function 131 and displays the information. Then, when flow design creation is input from the developer 3, the rendering unit 170 requests the analysis flow design function 131 to create flow design. When specification of a database (input DB specification) is input from the developer 3, the rendering unit 170 transmits input DB specification to the analysis flow design function 131. When an instruction for displaying the cache update button is received from the DB information browsing function 132, the rendering unit 170 displays the update button 171 for the developer 3. Then, when the developer 3 performs a pressing operation on the update button 171, the rendering unit 170 passes the fact that the pressing operation on the update button 171 has been performed to the DB information browsing function 132. Thereafter, the rendering unit 170 receives, from the DB information browsing function 132, the information on the database 210 after the cache update is performed, and displays the information.

Step S202 illustrated in FIG. 4 is processing by the analysis flow design function 131, and the processing is started when access from the rendering unit 170 to the data processing development module 130 occurs. At this time, the analysis flow design function 131 acquires the connection information of the already registered database 210 from the registration DB information 161, and transmits the connection information to the rendering unit 170. Subsequently, in step S202, when input DB specification is received from the rendering unit 170, the analysis flow design function 131 transmits the input database to the DB information browsing function 132. At the input DB specification, the developer 3 specifically describes, as the input DB, the host name of the database, the database name, the schema name, the table name, the user, and the password.

Step S203 illustrated in FIG. 4 is processing by the DB information browsing function 132. In step S203, when receiving the connection information related to the input DB from the analysis flow design function 131, the DB information browsing function 132 transmits the input DB to the cache update constraint information 162, and acquires the cache update constraint having been set for the target database 210. By transmitting the input DB to the analysis part cache 150, the DB information browsing function 132 confirms whether or not the cache of the target database 210 exists in the analysis part cache 150. Thereafter, the DB information browsing function 132 transmits the input DB and the cache update constraint to the update determination module 120, and acquires the result of whether or not the developer 3 can update the cache. Here, if the cache is updatable, the DB information browsing function 132 notifies the rendering unit 170 of display of a cache update button (the update button 171). When a notification indicating that the update button 171 has been pressed is received from the rendering unit 170, the DB information browsing function 132 issues a cache update query to the update determination module 120. Then, when the cache update is performed and the data of the updated database 210 is received from the update determination module 120, the DB information browsing function 132 transmits the received data to the rendering unit 170.

Step S204 illustrated in FIG. 4 is processing by the update determination module 120, and is processing executed when the input DB specification is performed by the developer 3. In step S204, when receiving the input DB and the cache update constraint from the DB information browsing function 132, the update determination module 120 determines, based on the cache update constraint, whether the cache can be updated for the database 210 indicated by the input DB, and transmits the determination result (update determination result) to the DB information browsing function 132. Thereafter, regardless of the update determination result, the update determination module 120 writes the update result into the update log 163. At the time point of step S204, the update determination module 120 has not received the registration time flag from the update constraint input function 111 (see step S103 in FIG. 3), and therefore the acquisition (see step S104 in FIG. 3) of the metadata 211 to the database 210 is not performed.

Step S205 illustrated in FIG. 4 is processing by the update determination module 120, and is processing executed when the developer 3 performs a pressing operation on the update button 171. In step S205, when receiving a cache update query from the DB information browsing function 132, the update determination module 120 issues the query to the database 210 indicated by the input DB, receives the result, and updates the analysis part cache 150. Thereafter, the update determination module 120 writes the update result into the update log 163.

(1-3) Individual Processing

Hereinafter, individual processing executed by each function, module, and the like in the overall processing by the data processing system 1 described above with reference to FIGS. 3 and 4 will be described in detail.

(1-3-1) DB Information Input Function 112

Figure 5:
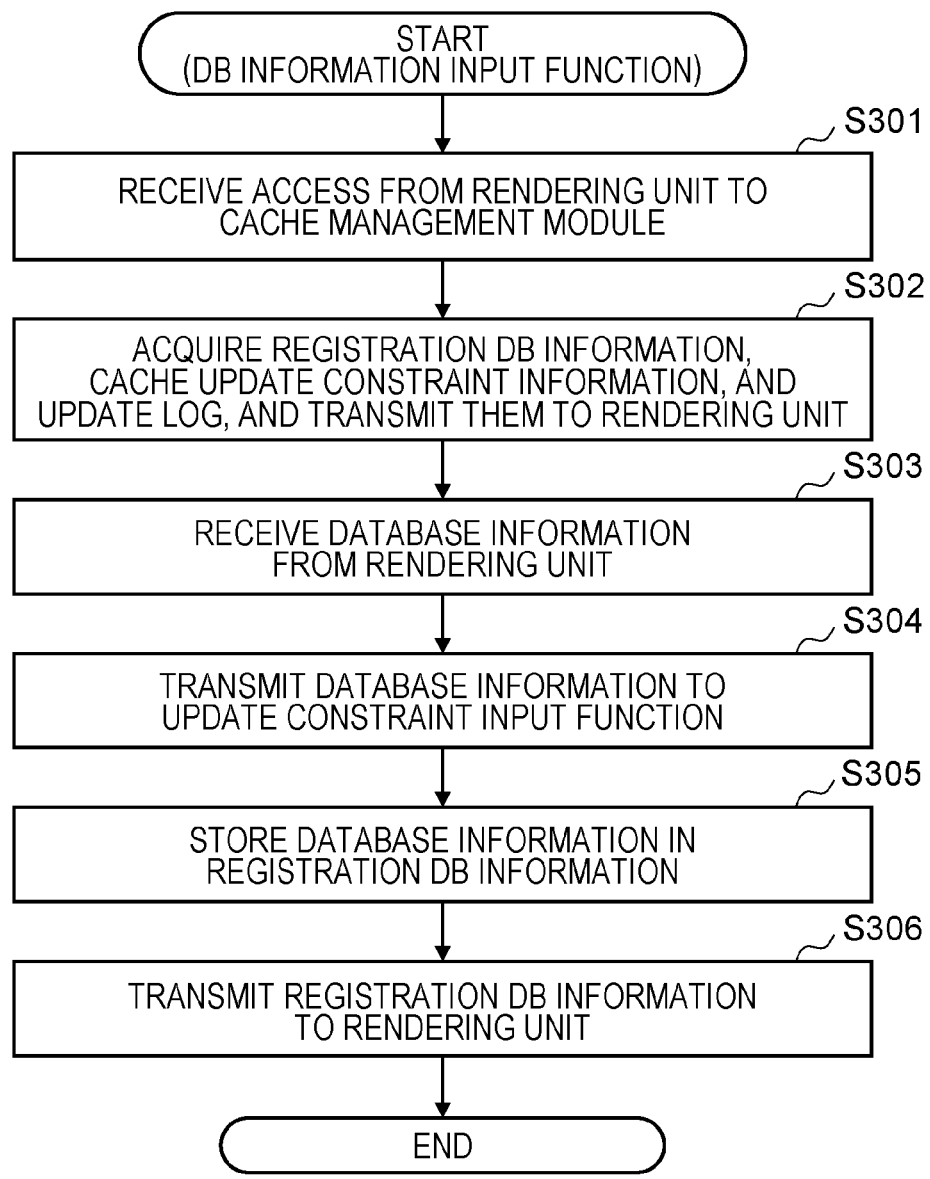
FIG. 5 is a flowchart illustrating a processing procedure example of processing by a DB information input function 112.

FIG. 5 is a flowchart illustrating a processing procedure example of processing by the DB information input function 112. The processing illustrated in FIG. 5 corresponds to the processing of step S102 in FIG. 3.

According to FIG. 5, first, the DB information input function 112 receives, from the rendering unit 170, that there has been an access to the cache management module 110 (step S301).

Next, the DB information input function 112 acquires the registered registration DB information 161 stored in the data storage unit 160, the cache update constraint information 162, and the update log 163, and transmits them to the rendering unit 170 (step S302).

Next, the DB information input function 112 receives, from the rendering unit 170, the DB information 101 to be newly registered that the DB administrator 2 has input (step S303), and transmits the received DB information 101 to the update constraint input function 111 (step S304).

Then, the DB information input function 112 stores the DB information 101 received in step S303 into the registration DB information 161 (step S305).

Figure 6:
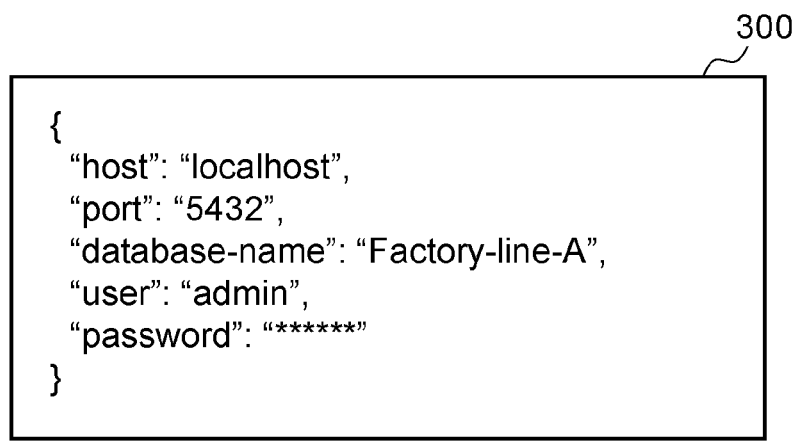
FIG. 6 is a view illustrating an example of DB information 101.

FIG. 6 is a view illustrating an example of the DB information 101. DB information 300 illustrated in FIG. 6 illustrates an example of a code of the DB information 101 when stored into the registration DB information 161, and information on the database is described in the JSON format. The description content of the DB information 300 illustrated in FIG. 6 corresponds to the input content on a DB information input screen 360 of FIG. 18 described later. By storing such DB information into the registration DB information 161, the developer 3 can access the database. Note that the description format of the DB information 101 is not limited to the JSON format, and may be, for example, a database format or the like.

Finally, the DB information input function 112 transmits, to the rendering unit 170 (step S306), information (i.e., the registration DB information 161 after the update in step S305) on the registered database 210 including the newly registered DB information 101, and ends the series of processing.

(1-3-2) Update Constraint Input Function 111

Figure 7:
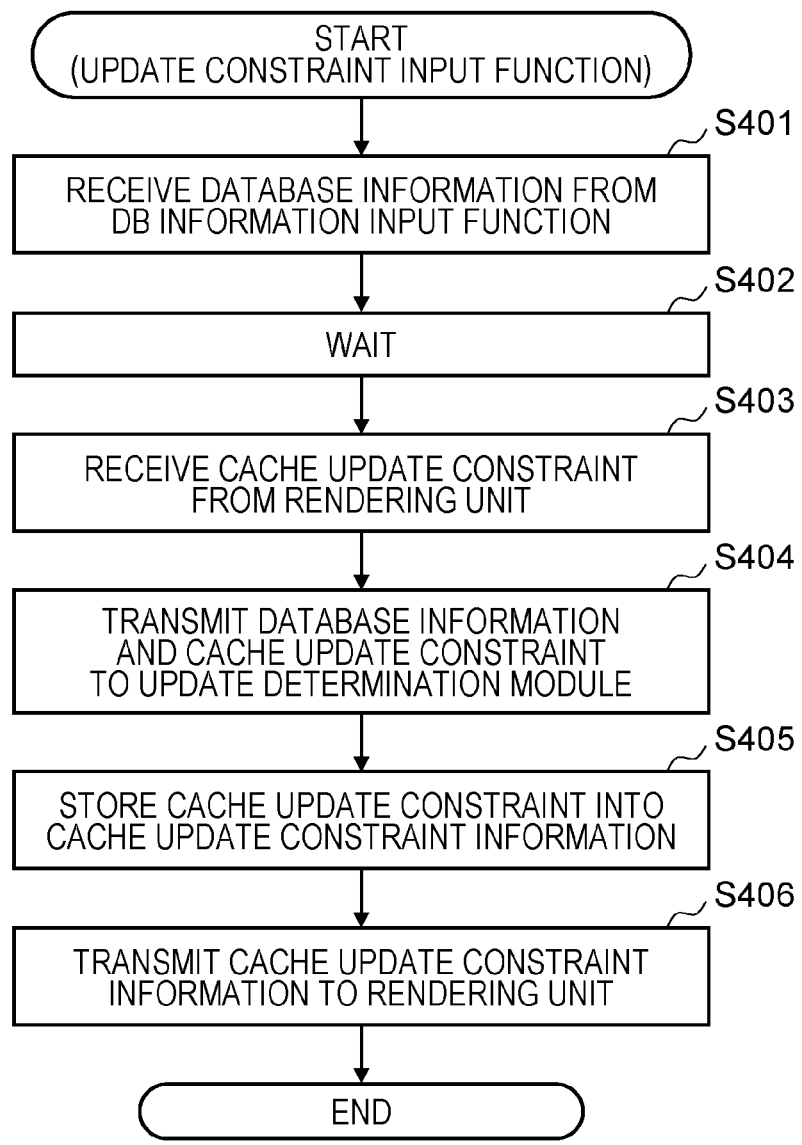
FIG. 7 is a flowchart illustrating a processing procedure example of processing by an update constraint input function 111.

FIG. 7 is a flowchart illustrating a processing procedure example of processing by the update constraint input function 111. The processing illustrated in FIG. 7 corresponds to the processing of step S103 in FIG. 3.

According to FIG. 7, first, the update constraint input function 111 receives, from the DB information input function 112, the DB information 101 having been input by the DB administrator 2 (step S401). After step S401, the update constraint input function 111 waits until the cache update constraint 102 for the database of the DB information 101 received in step S401 is input on the rendering unit 170 (step S402).

Then, when the input cache update constraint 102 is received from the rendering unit 170 (step S403), the update constraint input function 111 transmits, to the update determination module 120, the DB information 101 received in step S401 and the cache update constraint 102 received in step S403 (step S404). At this time, the update constraint input function 111 transmits them together with a registration time flag.

Next, the update constraint input function 111 stores the cache update constraint 102 into the cache update constraint information 162 (step S405).

Figure 8:
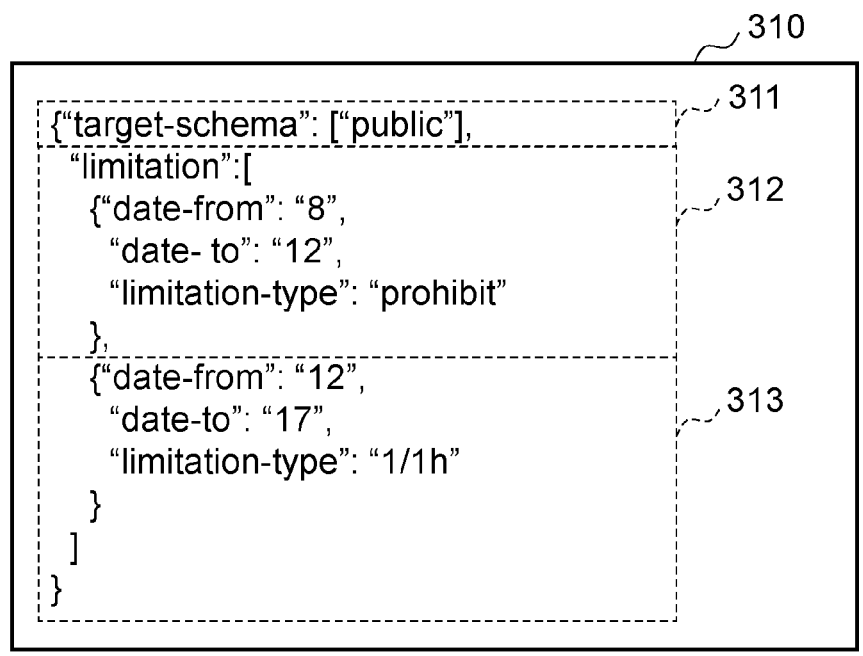
FIG. 8 is a view illustrating an example of a cache update constraint 102.

FIG. 8 is a view illustrating an example of the cache update constraint 102. A cache update constraint 310 illustrated in FIG. 8 illustrates an example of a code of the cache update constraint 102 when stored into the cache update constraint information 162, and the constraint of the cache update is described in the JSON format. The description content of the cache update constraint 310 illustrated in FIG. 8 corresponds to the input content on a cache update constraint input screen 370 illustrated in FIG. 19 described later. Specifically, the cache update constraint 310 describes that the constraint target schema is "public" (code 311), and, as the contents of the constraint, that "update is prohibited from 8 o'clock to 12 o'clock" (code 312), and that "update is allowed once an hour from 12 o'clock to 17 o'clock" (code 313). Note that the description format of the cache update constraint 102 is not limited to the JSON format, and may be, for example, a database format or the like.

Finally, the update constraint input function 111 transmits, to the rendering unit 170, the cache update constraint information 162 (i.e., the cache update constraint information 162 updated in step S405) including the newly input cache update constraint 102 (step S406), and ends the series of processing.

(1-3-3) Update Determination Module 120

Figure 9:
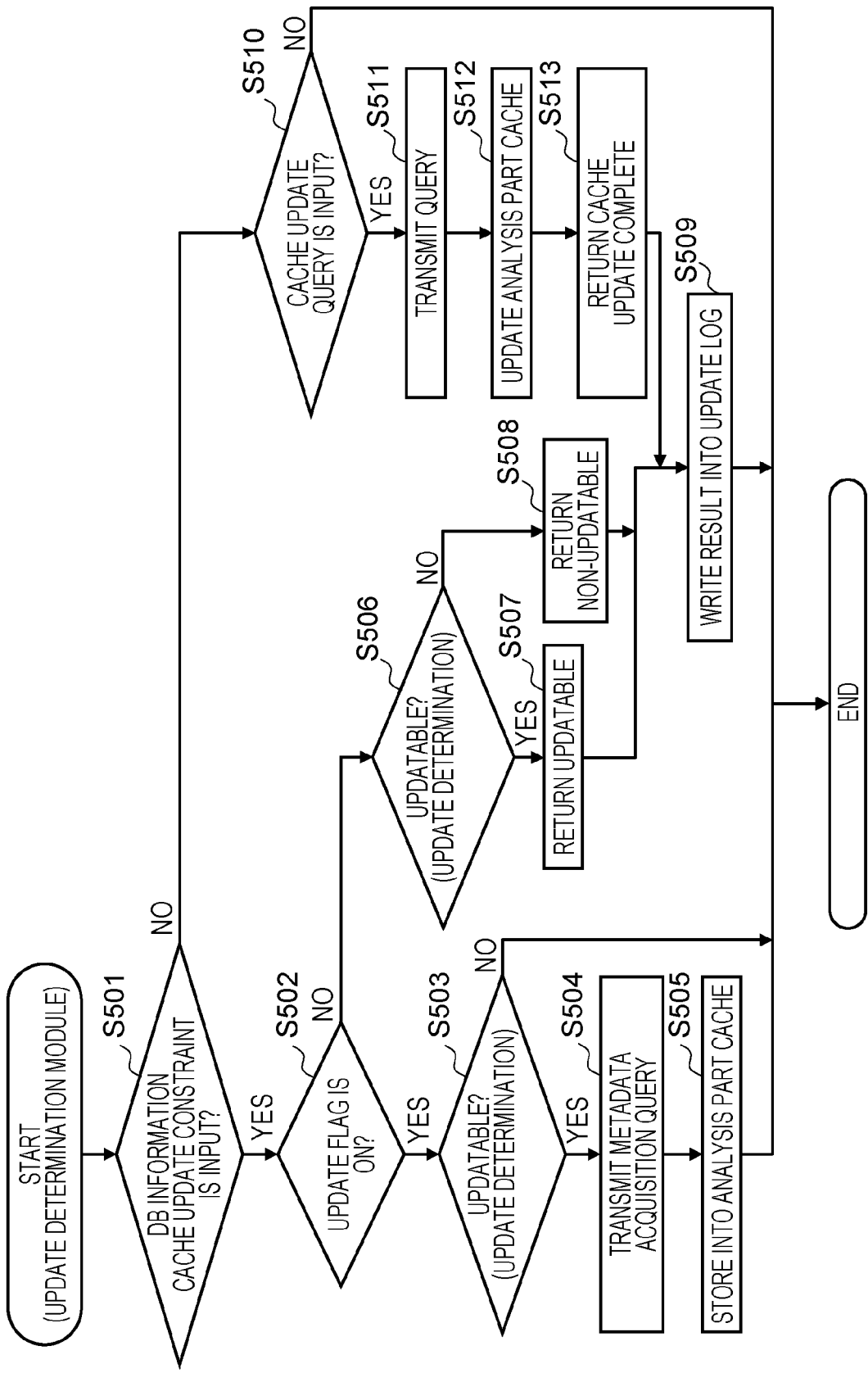
FIG. 9 is a flowchart illustrating a processing procedure example of processing by an update determination module 120.

FIG. 9 is a flowchart illustrating a processing procedure example of processing by the update determination module 120. The processing illustrated in FIG. 9 corresponds to the processing of step S104 in FIG. 3 and the processing of steps S204 and S205 in FIG. 4. The update determination module 120 is in a standby state until a certain input is made from the update constraint input function 111, and starts the processing of FIG. 9 with the input from the update constraint input function 111 as a trigger.

According to FIG. 9, first, the update determination module 120 determines whether or not the DB information 101 and the cache update constraint 102 are input (step S501). The process proceeds to step S502 if the input is made (YES in step S501), and the process proceeds to step S510 described later if another input is made (NO in step S501).

In step S502, the update determination module 120 determines whether or not the update flag is ON in addition to the DB information 101 and the cache update constraint 102 confirmed in step S501. The update flag is a flag that is turned on when a registration time flag is received from the update constraint input function 111. Therefore, the processing of step S502 can also be said to be processing of determining whether or not the registration time flag has been input from the update constraint input function 111. If the update flag is ON in step S502 (YES in step S502), it is regarded as processing in a situation where the DB administrator 2 has input the DB information 101 and the cache update constraint 102, and the process proceeds to step S503. On the other hand, if the update flag is not ON (it is OFF) in step S502 (NO in step S502), it is regarded as processing in a situation where the update determination of the analysis part cache 150 corresponding to the database 210 is performed when the developer 3 specifies the database 210, and the process proceeds to step S506.

First, the processing when the process proceeds from step S502 to step S503 will be described. The processing of steps S503 to S505 corresponds to the processing of step S104 in FIG. 3.

In step S503, the update determination module 120 determines whether or not the analysis part cache 150 can be updated based on the cache update constraint 102 having been input. The process proceeds to step S504 if the analysis part cache 150 is updatable (YES in step S503), and the update determination module 120 ends the processing if the analysis part cache 150 cannot be updated (NO in step S503).

FIG. 10 is an example of a code for performing update determination. An update determination module 320 illustrated in FIG. 10 determines whether or not update is allowed with respect to a constraint by time. Specifically, a code 321 describes processing in which current date and time and constraint are collated and if they conform to each other, a query is transmitted to the database. A code 322 describes processing in which "1" is returned if the current date and time is between the constraint date and time, and the schema of the constraint and the schema of the input database correctly coincide with each other.

When the analysis part cache 150 is updatable, the update determination module 120 transmits, in step S504, a metadata acquisition query to the database 210. This metadata acquisition processing is performed by the developer 3 to acquire the schema and the table name of a database that can be specified in the analysis flow design function 131. This is also because the metadata is frequently referred to in data analysis, and the update frequency at the time of development can be reduced by storing the metadata into the cache in advance.

FIG. 11 is a code example of a connection query. A connection query 330 illustrated in FIG. 11 is a query executed in the update determination module 120 in order to transmit a metadata acquisition query, and describes processing of first designating the database of a transmission destination (confirming communication with the database) and transmitting the query in a subsequent code 331.

Then, after step S504 ends, the update determination module 120 stores the result (metadata 211) received from the database 210 in step S504 into the analysis part cache 150 as the metadata 151 (step S505), and ends the processing.

Next, the processing when the process proceeds from step S502 to step S506 will be described. The processing of steps S506 to S509 corresponds to the processing of step S204 in FIG. 4.

In step S506, similarly to step S503, the update determination module 120 determines whether or not the analysis part cache 150 can be updated based on the cache update constraint 102 having been input.

If the analysis part cache 150 is updatable in step S506 (YES in step S506), the update determination module 120 transmits, to the DB information browsing function 132 (step S507), information indicating that update is possible, writes the update result into the update log 163 (step S509), and ends the processing. On the other hand, when the analysis part cache 150 is not updatable in step S506 (NO in step S506), the update determination module 120 transmits, to the DB information browsing function 132 (step S508), information indicating that update is not possible, writes the update result into the update log 163 (step S509), and ends the processing.

Next, the processing when the process proceeds from step S501 to step S510 will be described. The processing of steps S510 to S513 and S509 corresponds to the processing of step S205 in FIG. 4.

In step S510, the update determination module 120 determines whether or not a cache update query has been input from the update constraint input function 111. When the input is a cache update query (YES in step S510), it is regarded that the update button 171 is pressed by the developer 3, and the process proceeds to step S511 to execute the update of the analysis part cache 150. In a case where the input is other than a cache update query (NO in step S510), the update determination module 120 ends the processing.

In step S511, the update determination module 120 transmits the input cache update query to the database 210 and receives the result. Then, the update determination module 120 updates the analysis part cache 150 with the result received in step S511 (step S512).

Thereafter, the update determination module 120 transmits the update result (that the cache update is completed) in step S512 to the DB information browsing function 132 (step S513), writes the update result into the update log 163 (step S509), and ends the processing.

FIG. 12 is a view illustrating an example of the update log 163. An update log 340 illustrated in FIG. 12 is a specific example of the update log 163 in which a log is recorded for each update, and describes success or failure of the update, date and time information of execution of the update, and the update contents. Specifically, for example, a log 341 indicates that a SELECT query for the schema "public" of the database name "Factory-C" was executed at 14:15 on Sep. 15, 2020, and the cache was updated.

(1-3-4) Analysis Flow Design Function 131

Figure 13:
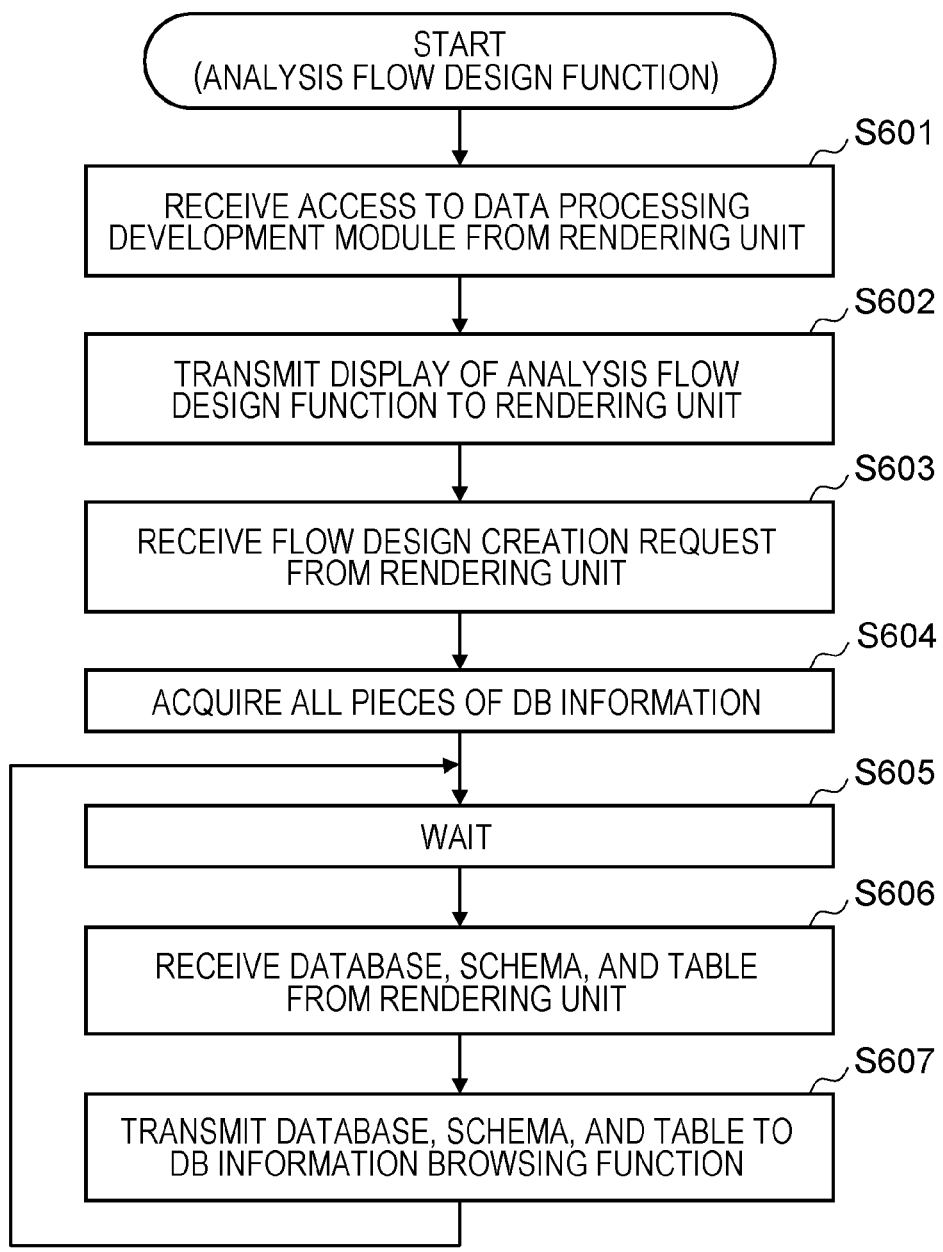
FIG. 13 is a flowchart illustrating a processing procedure example of processing by an analysis flow design function 131.

FIG. 13 is a flowchart illustrating a processing procedure example of processing by the analysis flow design function 131. The processing illustrated in FIG. 13 corresponds to the processing of step S202 in FIG. 4, and the processing is started when access from the rendering unit 170 to the data processing development module 130 occurs.

According to FIG. 13, first, the analysis flow design function 131 receives, from the rendering unit 170, that there has been an access to the data processing development module 130 (step S601). On the other hand, the analysis flow design function 131 instructs the rendering unit 170 to display the analysis flow design function (step S602).

Next, upon receiving, from the rendering unit 170, that the creation operation in the flow design function has been performed on the rendering unit 170 (step S603), the analysis flow design function 131 acquires information on all the databases 210 registered by the DB administrator 2 from the registration DB information 161 (step S604) and waits until the next input from the rendering unit 170 (step S605).

Thereafter, when the input DB is specified on the rendering unit 170 (input DB specification), the analysis flow design function 131 receives the database, the schema, the table information, and the like from the rendering unit 170 (step S606). In this case, the analysis flow design function 131 transmits the information received in step S606 to the DB information browsing function 132 (step S607), and then returns to the standby state of step S605 again.

(1-3-5) DB Information Browsing Function 132

Figure 14:
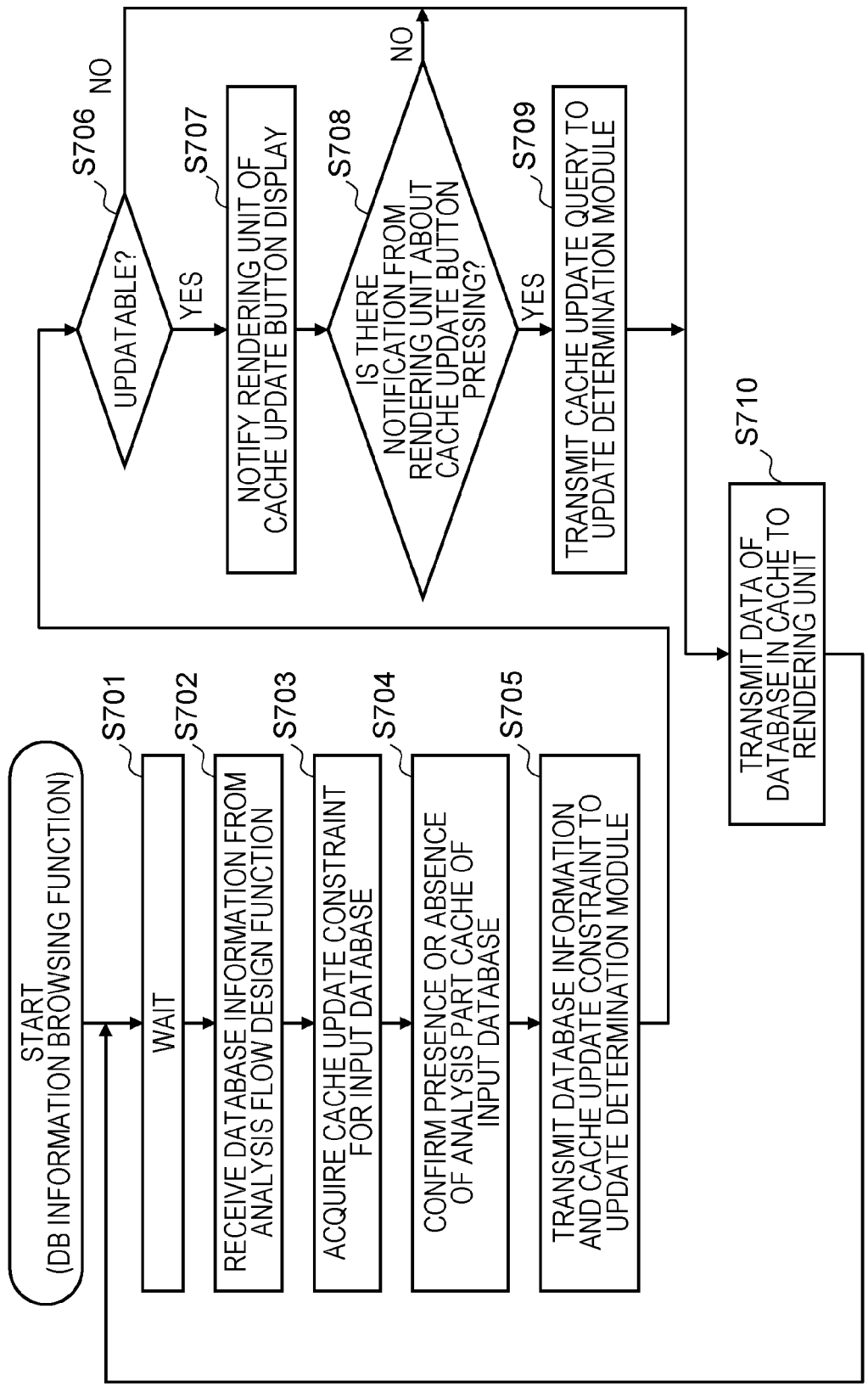
FIG. 14 is a flowchart illustrating a processing procedure example of processing by a DB information browsing function 132.

FIG. 14 is a flowchart illustrating a processing procedure example of processing by the DB information browsing function 132. The processing illustrated in FIG. 14 corresponds to the processing of step S203 in FIG. 4. The DB information browsing function 132 has a function of managing display/non-display of the update button 171 (more specifically, a schema update button 395 and a table update button 396 on a DB specification screen 390 illustrated in FIG. 21 described later) of the rendering unit 170 and managing the data (e.g., the metadata 151 and the column data 152) in the analysis part cache 150.

According to FIG. 14, normally, the DB information browsing function 132 is in the standby state (step S701). Then, when the database, the schema, and the table information are input from the developer 3 onto the rendering unit 170, as described in step S607 of FIG. 13, the input information is transferred by the analysis flow design function 131 and received by the DB information browsing function 132 (step S702).

Next, based on the input information received in step S702, the DB information browsing function 132 acquires, from the cache update constraint information 162, the cache update constraint having been set for the target database 210 (step S703). Based on the input information received in step S702, the DB information browsing function 132 confirms whether or not the cache of the target database 210 exists in the analysis part cache 150 (step S704).

Next, the DB information browsing function 132 transmits, to the update determination module 120, the input information (DB information) received in step S702 and the cache update constraint acquired in step S703 (step S705). As described in steps S506 to S508 of FIG. 9, the update determination module 120 having received them determines whether or not the analysis part cache 150 is updatable, and transmits the result to the DB information browsing function 132.

Next, the DB information browsing function 132 determines whether or not the information (the update determination result of the analysis part cache 150) received from the update determination module 120 is updatable (step S706). If it is updatable (YES in step S706), the process proceeds to step S707. If it is not updatable (NO in step S706), the process proceeds to step S710 described later.

In step S707, since the analysis part cache 150 is updatable, the DB information browsing function 132 transmits, to the rendering unit 170, a notification for displaying the update button 171. Note that, regarding the expression of display/non-display of the update button 171, in the present description, a display mode capable of accepting an operation from the developer 3 is referred to as "display", and a display mode not accepting an operation from the developer 3 is referred to as "non-display". Therefore, a case of being displayed in an inoperable form from the developer 3 such as the table update button 396 illustrated in FIG. 21 described later, for example, also corresponds to "non-display".

Thereafter, the DB information browsing function 132 determines whether or not a pressing operation (pressing of the cache update button) of the update button 171 by the developer 3 has been notified from the rendering unit 170 (step S708). In step S708, if the notification is received (YES in step S708), the process proceeds to step S709, and if the notification is not received (NO in step S708), the process proceeds to step S710.

In step S709, the DB information browsing function 132 issues a cache update query to the update determination module 120. Then, when a completion notification of cache update is received from the update determination module 120, the process proceeds to step S710. At the time of the completion notification, the data of the database 210 after the cache update is also received.

In step S710, the DB information browsing function 132 transmits the data of the database 210 to the rendering unit 170 in order to display the specified table data in the analysis part cache 150. Thereafter, the process returns to step S701 and stands by.

(1-3-6) Rendering Unit 170

Figure 15:
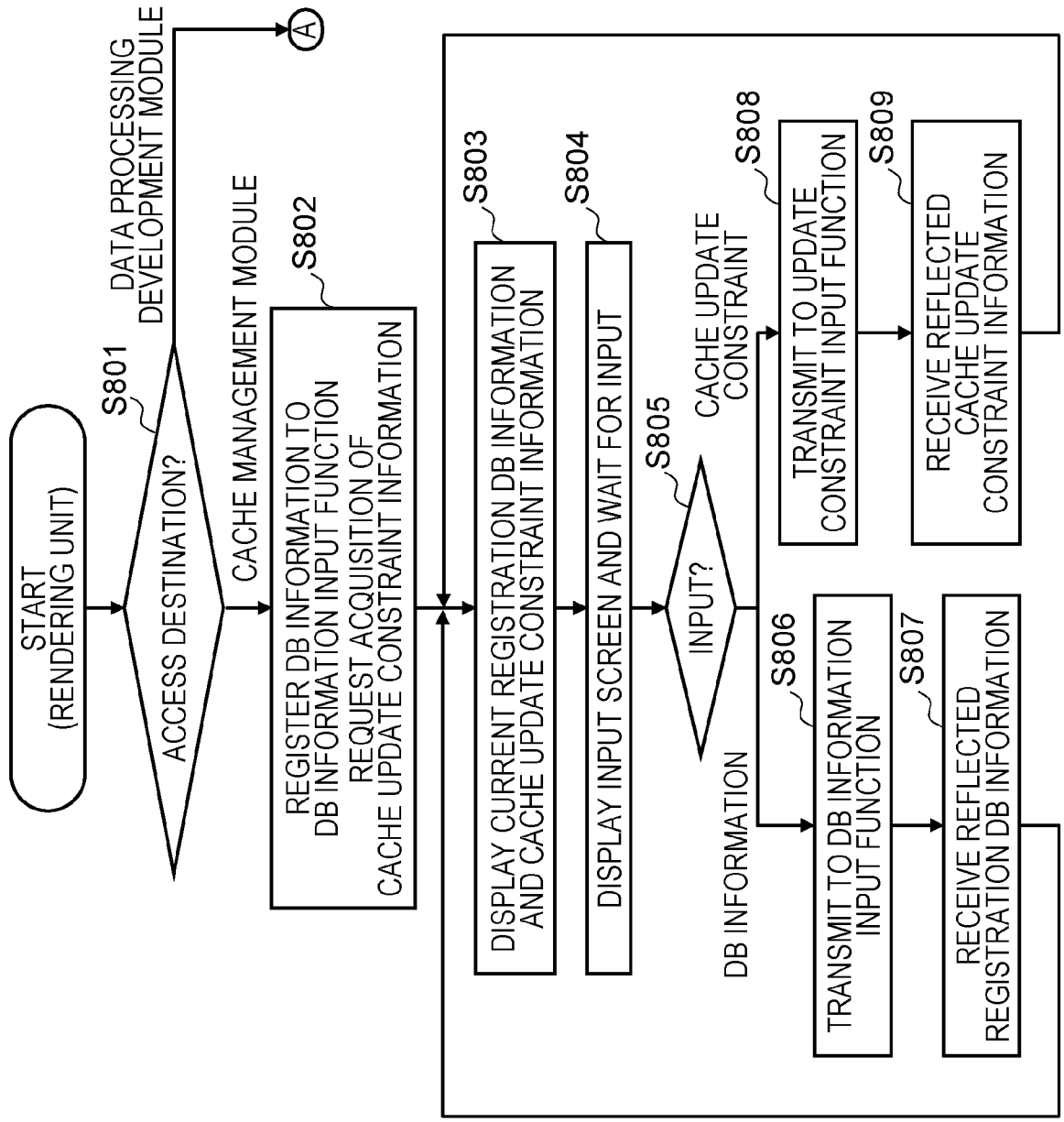
FIG. 15 is a flowchart (part 1) illustrating a processing procedure example of processing by a rendering unit 170.
Figure 16:
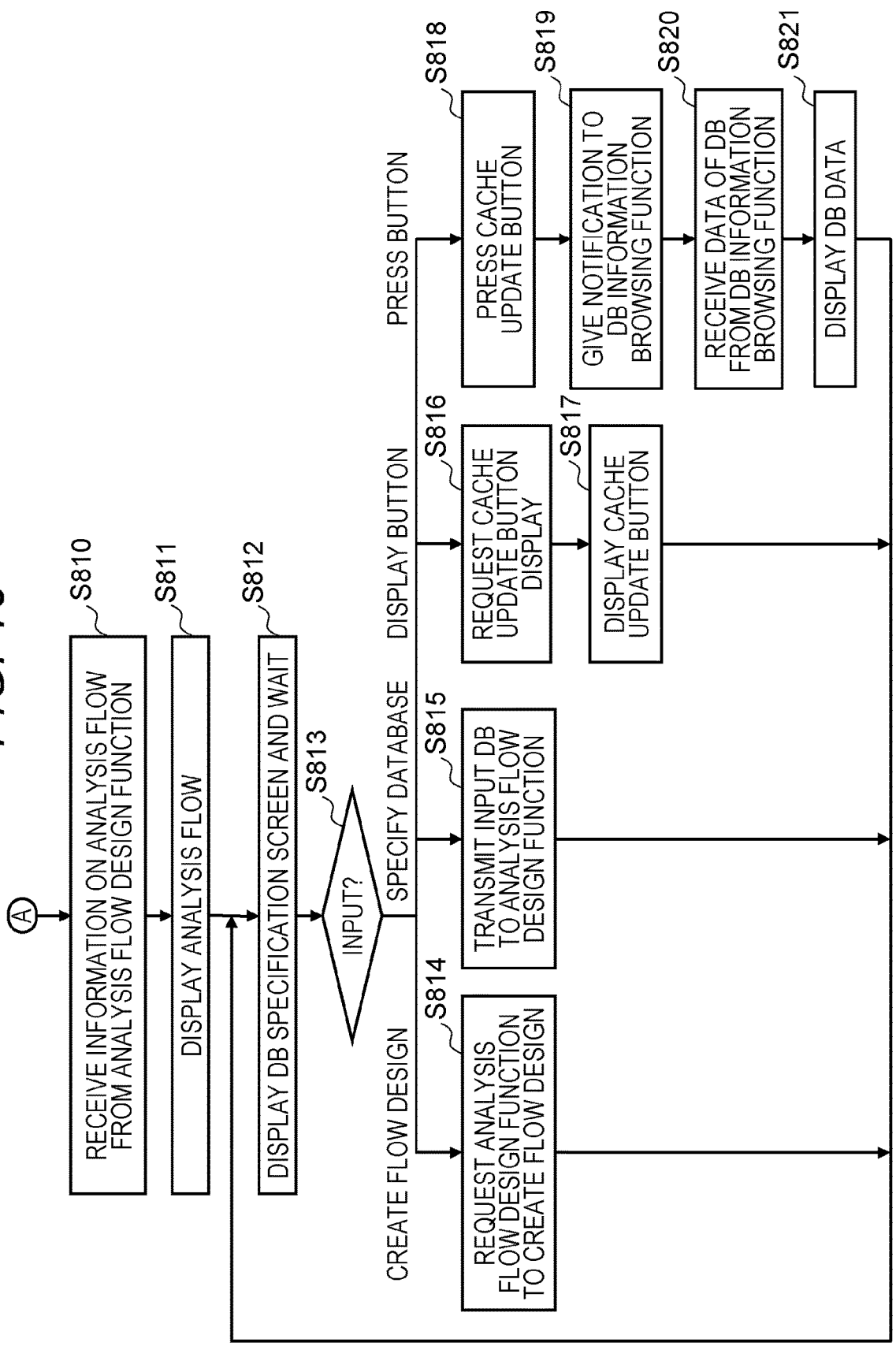
FIG. 16 is a flowchart (part 2) illustrating a processing procedure example of processing by the rendering unit 170.

FIGS. 15 and 16 are flowcharts (part 1 and part 2) illustrating a processing procedure example of the processing by the rendering unit 170. The processing illustrated in FIG. 15 corresponds mainly to the processing of step S101 in FIG. 3, and the processing illustrated in FIG. 16 corresponds to the processing of step S201 in FIG. 4.

According to FIG. 15, first, when there has been an access from the DB administrator 2 or the developer 3, the rendering unit 170 determines whether to display the cache management module 110 or to display the data processing development module 130 in accordance with the access destination (step S801). The process proceeds to step S802 if the access destination is the cache management module 110, and the process proceeds to step S810 in FIG. 16 if the access destination is the data processing development module 130.

First, the processing when the process proceeds from step S801 to step S802 will be described. As described above, the processing of steps S802 to S809 corresponds to the processing (step S101 in FIG. 3) by the rendering unit 170 in the cache update constraint registration processing.

In a case where the access destination is the cache management module 110, the rendering unit 170 requests the DB information input function 112 to acquire the registration DB information 161 in order to display the registration DB information 161 already registered (step S802).

Then, the rendering unit 170 receives data (at least the registration DB information 161 and the cache update constraint information 162) related to the currently registered database 210 from the DB information input function 112, and displays the received data on the registration DB list screen (step S803).

FIG. 17 is a view illustrating an example of the registration DB list screen. A registration DB list screen 350 illustrated in FIG. 17 is a screen for displaying data related to each registered database 210, and also displays information by the update log 163 in addition to the registration DB information 161 and the cache update constraint information 162. Specifically, in the registration DB list screen 350 of FIG. 17, a host 351 indicating a host name, a port 352 indicating a port number, a DB name 353 indicating a database name, a user 354 indicating a user name, a pass 355 indicating a password, a constraint 356 indicating a cache update constraint, and a log 357 indicating an update log are displayed for each registered database.

Next, the rendering unit 170 displays an input screen (the DB information input screen and the cache update constraint input screen) for the DB administrator 2 to input the DB information 101 or the cache update constraint 102, and waits until the input is performed (step S804).

FIG. 18 is a view illustrating an example of the DB information input screen. The DB information input screen 360 illustrated in FIG. 18 is a screen for inputting the DB information 101 necessary for connecting to the database 210 to be registered, and specifically includes a host name entry field 361, a port number entry field 362, a database name entry field 363, a user name entry field 364, and a password entry field 365. Note that the type of the entry field provided on the DB information input screen is not limited to the example of FIG. 18, and it is necessary to appropriately describe necessary information as database information according to the type of database. Then, when a pressing operation on the OK button 366 is performed, the input is settled.

FIG. 19 is a view illustrating an example of a cache update constraint input screen. The cache update constraint input screen 370 illustrated in FIG. 19 is a screen for inputting the cache update constraint 102 to be imposed on the database 210 to be registered. Specifically, a schema or a table of a target for which a constraint is necessary is input into an entry field 371, and a detailed constraint content is input into an entry field 373. In the case of FIG. 19, the entry field 373 is implemented in a form in which fine update limitation can be performed by time. If registration of a constraint is not necessary, the cache can be immediately updated, and it is therefore only required to check a check field 372. Then, when a pressing operation on an OK button 374 is performed, the input is settled.

As a specific content of the update constraint, in the case of FIG. 19, for example, the following constraint is imposed: the cache can be immediately updated without limitation from 0 o'clock to 8 o'clock; there is a constraint that the cache cannot be updated from 8 o'clock to 12 o'clock; the cache update is limited to one time per hour from 12 o'clock to 17 o'clock; and only update of metadata is possible from 17 o'clock to 24 o'clock (see the entry field 373). Note that the format of the entry field provided on the cache update constraint input screen is not limited to the format of FIG. 19, and may be limitable by the update frequency, the data size required for the update, and the like in addition to the above-described constraint by time.

Next, the rendering unit 170 determines as to which of the DB information input screen and the cache update constraint input screen the input has been settled on (which of the DB information 101 and the cache update constraint 102 has been input) (step S805). The process proceeds to step S806 if the DB information 101 is input, and the process proceeds to step S808 if the cache update constraint 102 is input.

If the DB information 101 is input, the rendering unit 170 transmits the input DB information 101 to the DB information input function 112 (step S806). The DB information input function 112 performs processing of storing the DB information 101 transmitted in step S806 into the registration DB information 161. Then, the rendering unit 170 receives, from the DB information input function 112, the registration DB information 161 on which the input DB information 101 is reflected (step S807), and the process returns to the processing of step S803 again. Note that the information received in step S807 is reflected onto the display content of the registration DB list screen when the process proceeds to step S803.

On the other hand, if the cache update constraint 102 is input, the rendering unit 170 transmits the input cache update constraint 102 to the update constraint input function 111 (step S808). The update constraint input function 111 performs processing of storing the cache update constraint 102 transmitted in step S808 into the cache update constraint information 162. Then, the rendering unit 170 receives, from the update constraint input function 111, the cache update constraint information 162 on which the input cache update constraint 102 is reflected (step S809), and the process returns to the processing of step S803 again. Note that the information received in step S809 is reflected onto the display content of the registration DB list screen when the process proceeds to step S803.

Next, the processing when the process proceeds from step S801 to step S810 will be described. As described above, the processing of steps S810 to S821 corresponds to the processing (step S201 in FIG. 4) by the rendering unit 170 in the arbitrary cache update processing.

If the access destination is the data processing development module 130, the rendering unit 170 fetches information on the analysis flow currently being designed by the developer 3 to the analysis flow design function 131 (step S810). Specifically, the rendering unit 170 makes an access notification to the analysis flow design function 131 and receives the information of the analysis flow as a response.

Then, the rendering unit 170 displays, on the analysis flow design screen, the information received from the analysis flow design function 131 in step S810 (step S811).

Figure 20:
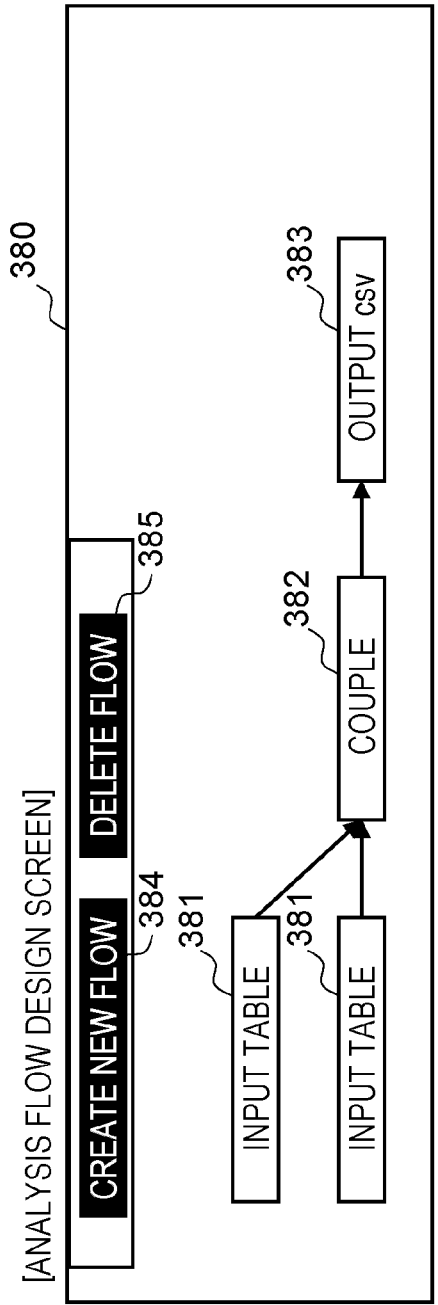
FIG. 20 is a view illustrating an example of an analysis flow design screen.

FIG. 20 is a view illustrating an example of the analysis flow design screen. In an analysis flow design screen 380 illustrated in FIG. 20, each procedure is displayed as one node, and a screen on which the order of processing can be designed by connecting the nodes with arrows is displayed. For example, in the processing procedure illustrated in FIG. 20, a coupling node 382 executes coupling processing on the table of the database specified by a table input node 381, and subsequently, CSV output is performed to an output part specified by a CSV output node 383. On the analysis flow design screen 380, a button 384 is a button for creating a new analysis flow, and a button 385 is a button for deleting the analysis flow being displayed. Note that the display form of the analysis flow design screen is not limited to the example of FIG. 20. If a function capable of designing each data analysis processing including a procedure is included, it corresponds to the analysis flow design function 131.

Next, the rendering unit 170 displays a screen (DB specification screen) on which specification (setting) of the database can be input from the developer 3, and waits until receiving input from the developer 3 or display notification of a cache update button from the DB information browsing function 132 (step S812).

Figures 21, 22:
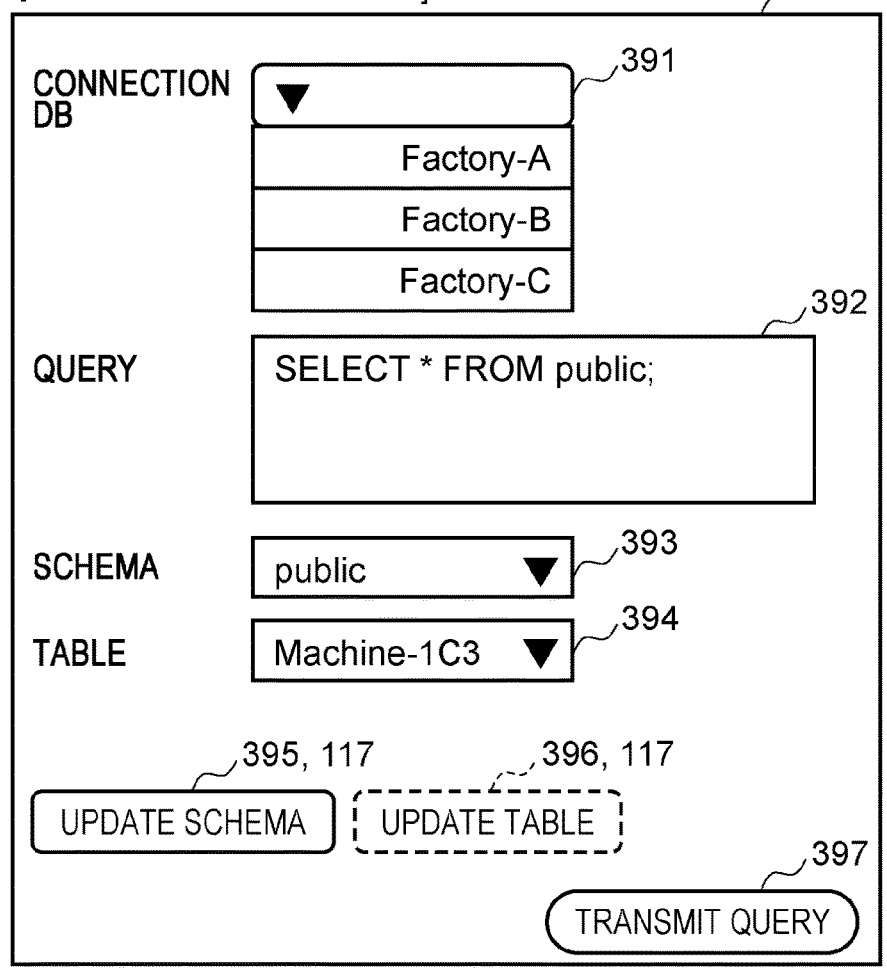
FIG. 21 is a view illustrating an example of a DB specification screen.
FIG. 22 is a view illustrating an example of a DB data display screen.

FIG. 21 is a view illustrating an example of the DB specification screen. When the developer 3 arranges the table input node 381 on the analysis flow design screen 380 of FIG. 20, the DB specification screen 390 as illustrated in FIG. 21 is displayed. On the DB specification screen 390 illustrated in FIG. 21, the database can be specified (set). Specifically, the database of a connection destination can be selected in a selection field 391, a query for data acquisition can be specified in an entry field 392, a target schema can be selected in a selection field 393, and a target table can be selected in a selection field 394. The schema update button 395 and the table update button 396 are the update buttons 171 displayed when the cache of the analysis part cache 150 is updatable that are displayed by schema and by table.

In the example of FIG. 21, since the schema update button 395 is displayed to be operable, the schema of the target database is updatable. On the other hand, since the table update button 396 is displayed to be inoperable (non-display in a broad sense), the table of the target database is not updatable. Then, specification of the connection DB (the selection field 391), the schema (the selection field 393), and the table (the selection field 394) on the DB specification screen 390 of FIG. 21 is defined as a database specification operation in step S813 described later.

Upon receiving the input from the developer 3 in the standby state of step S812 or the display notification of the cache update button from the DB information browsing function 132, the rendering unit 170 determines as to what input it is like, and sorts out the transition destination in accordance with the content (step S813). Specifically, if there is a flow design creation operation (operation on the button 384 on the analysis flow design screen 380) from the developer 3, the process proceeds to step S814. If there is a database specification operation (operation described above on the DB specification screen 390), the process proceeds to step S815. If there is a pressing operation (operation on the schema update button 395 or the table update button 396 on the DB specification screen 390) of the cache update button 171, the process proceeds to step S818. If the display notification of the update button 171 is input from the DB information browsing function 132, the process proceeds to step S816. Note that the flow design creation operation and the database specification operation are input by the user operating the button, the entry field, or the like on the screen displayed by the rendering unit 170.

When the process proceeds to step S814, the rendering unit 170 notifies (requests) the analysis flow design function 131 of the creation of the flow design, and then the process returns to step S812.

When the process proceeds to step S815, the rendering unit 170 transmits the specified database name to the analysis flow design function 131, and then the process returns to step S812.

When the process proceeds to step S816, the rendering unit 170 receives the display notification of the update button 171 (the schema update button 395 and the table update button 396) of the updatable target cache from the DB information browsing function 132. Note that, if the schema update button 395 and the table update button 396 are provided as the update buttons 171, the caches to be the target of the update buttons are the metadata 211 and the column data 212, respectively, of the database 210, and the update button 171 of the cache can be displayed by data.

Next, in response to the display notification received in step S816, the rendering unit 170 displays the update button 171 on the connection screen (step S817), as the schema update button 395 and the table update button 396 illustrated in FIG. 21, for example, and then the process returns to step S812.

When the process proceeds to step S818, the rendering unit 170 detects that the update button 171 has been pressed by the developer 3. Next, the rendering unit 170 notifies the DB information browsing function 132 that the update button 171 has been pressed (step S819). At this time, the notification includes information indicating the target cache. As described with reference to FIGS. 4, 9, and 13, the DB information browsing function 132 having received the notification that the update button 171 has been pressed transmits the cache update query to the update determination module 120 to cause the target cache of the target of the analysis part cache 150 to be updated.

Next, the rendering unit 170 receives data or metadata of the updated database 210 from the DB information browsing function 132 (step S820). Then, based on the data received in step S820, the rendering unit 170 displays the data or the metadata of the updated database on the DB data display screen (step S821), and then the process returns to step S812.

FIG. 22 is a view illustrating an example of the DB data display screen. For example, on a DB data display screen 400 of FIG. 22, a database, a schema, and data in the table are listed in a table form by a table 401. The display of the DB data display screen 400 plays an auxiliary role for enabling the developer 3 to easily check the internal data of the cache when performing data analysis.

As described above, the data processing system 1 according to the present embodiment has a function capable of giving, from the DB administrator 2, the cache update constraint that constrains the update of the cache to the data processing device 100 with which the developer 3 performs data analysis. The data processing system 1 according to the present embodiment has a function that enables the developer 3 to voluntarily execute the update of the cache in the data processing device 100 in the development phase of data analysis. When the function is executed, it is determined whether or not the update is possible based on the cache update constraint given by the DB administrator 2, and the cache update is executed only when the update is possible (i.e., under the constraint of the cache update constraint).

According to such the data processing system 1, the update of the cache is executed only under the constraint planned by the DB administrator 2, and the developer 3 can perform the cache update at an arbitrary timing under the constraint in the development phase of the data analysis. As a result, since the access to the database 210 by the cache update occurs only within a range required by the data analyst (the developer 3) and permitted by the database administrator (the DB administrator 2), the access frequency to the database 210 can be reduced, and the load due to the access can be reduced.

From the user's viewpoint, in the data processing system 1 according to the present embodiment, the function that enables the DB administrator 2 to impose a cache update constraint on the cache update of the analysis part cache 150 used in the development phase of the data analysis is implemented, and a function (the update button 171) that enables the developer 3 to voluntarily execute the cache update is implemented. Then, when the developer 3 requests execution of the cache update, the cache update is performed only when the update is possible under the update determination based on the cache update constraint. That is, if under the condition that satisfies the cache update constraint, the developer 3 can update the cache at an arbitrary timing.

(2) Second Embodiment

In the first embodiment described above, as illustrated in FIG. 2, the configuration in which the data processing system 1 includes one data processing device 100 has been mainly described. However, in the development phase of actual data analysis, it is common that a plurality of developers 3 perform data analysis at the same time. In order to meet such a demand, a configuration including a plurality of data processing devices 100 is only required. However, in this case, the analysis part cache 150 is necessary for each data processing device 100. However, a configuration in which each data processing device 100 has the analysis part cache 150 risks an increase in access to the database 210 due to cache update. There is also assumed a problem that consistency of target data of data analysis is sacrificed at different cache update timings.

Therefore, in the data processing system 4 according to the second embodiment described below, the cache management portion (mainly the analysis part cache 150 and the cache management module 110) in the data processing system 1 according to the first embodiment is separated from the data analysis portion (mainly the data processing development module 130 and the data processing module 140), and implemented as an independent cache DB management device 500. The data processing system 4 thus configured becomes possible to unify the analysis part cache 150 into one on the cache DB management device 500 side without having the analysis part cache 150 in a device (a data analysis device 600) on the data analysis side.

In the description of the second embodiment, the same reference numerals are used for common configuration, processing, and the like in the first embodiment, and the description thereof will be omitted.

(2-1) Configuration

Figure 23:
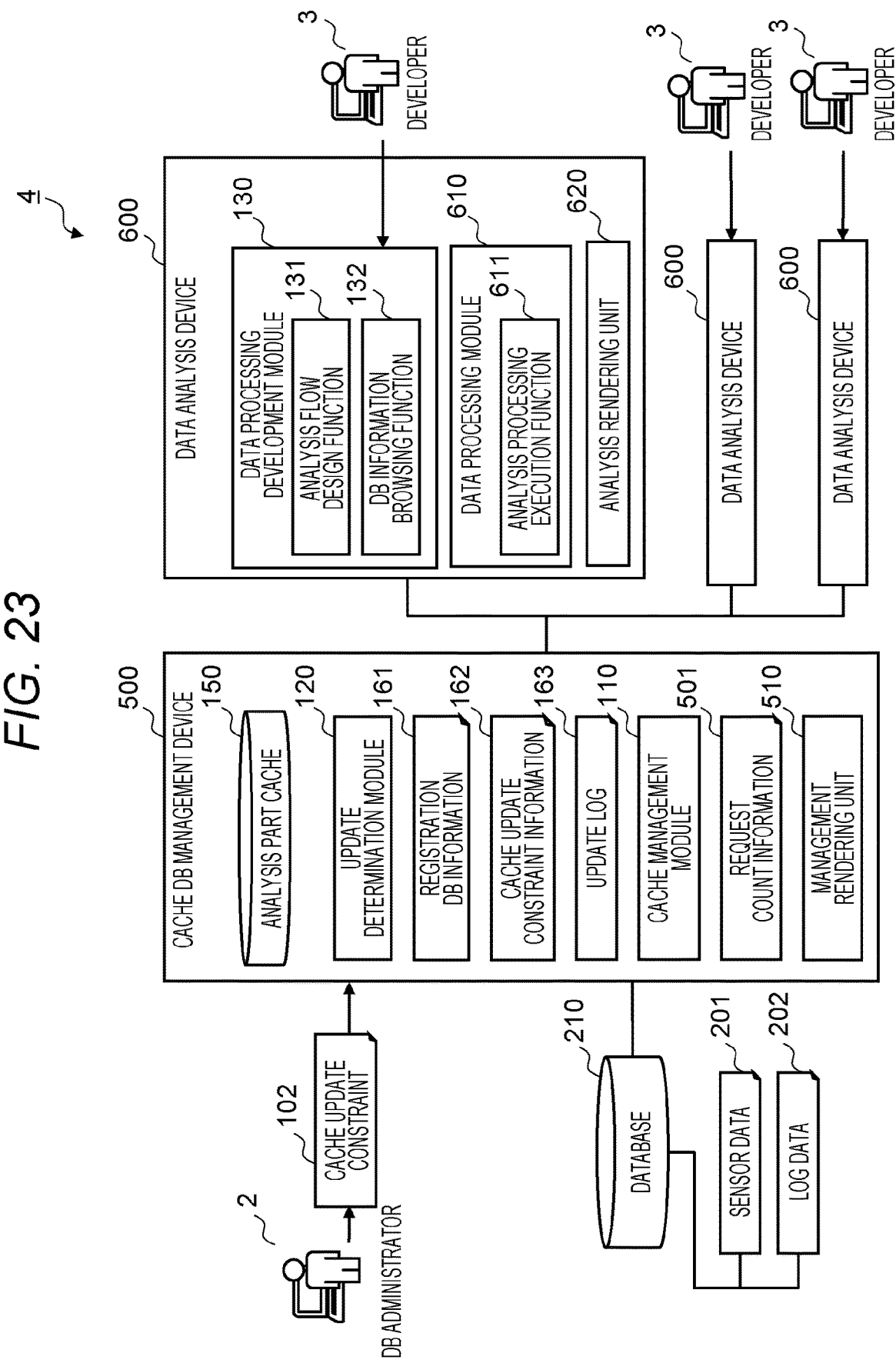
FIG. 23 is a block diagram illustrating a configuration example of a data processing system 4 according to a second embodiment of the present invention.

FIG. 23 is a block diagram illustrating a configuration example of the data processing system 4 according to the second embodiment of the present invention. As illustrated in FIG. 23, the data processing system 4 is configured to include the cache DB management device 500 and the data analysis device 600 instead of the data processing device 100 in the data processing system 1 (see FIGS. 1 and 2) according to the first embodiment. The data analysis device 600 is a plurality of devices on the data analysis side used by the developer 3 of data analysis, and is connected to the cache DB management device 500. The cache DB management device 500 is a device on a cache management side managed by the DB administrator 2 in which one device provides a cache (the analysis part cache 150) for the plurality of data analysis devices 600, and the cache DB management device 500 is connected to each data analysis device 600 and the database 210. Note that the database 210 suitable in the second embodiment is, for example, a core database.

In the configuration example illustrated in FIG. 23, a configuration that is not important in explanation of the second embodiment is not illustrated. The data processing system 4 may appropriately include the configuration of the data processing system 1 described in the first embodiment. Specifically, for example, the data processing system 4 may be considered to have the update constraint input function 111 and the DB information input function 112 in the cache management module 110, and the database 210 may be considered to be arranged in the database device 200.

The cache DB management device 500 includes the analysis part cache 150, the update determination module 120, the registration DB information 161, the cache update constraint information 162, the update log 163, the cache management module 110, request count information 501, and a management rendering unit 510. Of them, new configurations that are not included in the data processing device 100 of the data processing system 1 according to the first embodiment are the request count information 501 and the management rendering unit 510.

The management rendering unit 510 performs only rendering related to the cache DB management device 500 (rendering on the cache management side) among the functions of the rendering unit 170 according to the first embodiment.

The request count information 501 is data that records the number of times the update of the cache (the analysis part cache 150) has been requested from all the data analysis devices 600 for each data held in the database 210. Although details will be described later in the description of FIGS. 26 and 28, in the present embodiment, an action of each developer 3 specifying the database 210 on the data analysis device 600 is regarded as a data update request. The cache update processing is executed when the data update request is made for a certain number of times or more constrained by the DB administrator 2 (when the number of times of requests held in the request count information 501 becomes equal to or more than the constraint).

In the present embodiment, the DB administrator 2 can register the DB information 101 (not illustrated in FIG. 23) and the cache update constraint 102 into the cache DB management device 500. Then, as described above, the cache DB management device 500 is connected to the database 210.

The data analysis device 600 includes the data processing development module 130, a data processing module 610, and an analysis rendering unit 620.

The data processing module 610 has an analysis processing execution function 611 that executes processing for data analysis using the analysis flow designed by the analysis flow design function 131 of the data processing development module 130.

The analysis rendering unit 620 performs only rendering related to the data analysis device 600 (rendering on the data analysis side) among the functions of the rendering unit 170 in the first embodiment.

With the data processing system 4 thus configured, the plurality of developers 3 can execute data analysis using the respective data analysis devices 600. At this time, the analysis part cache referred to by all the data analysis devices 600 is the analysis part cache 150 of the cache DB management device 500, and the update determination of the cache depends on the cache update constraint information 162.

(2-2) Overall Processing

The overall processing executed by the data processing system 4 according to the second embodiment will be described with a focus on differences from the overall processing in the first embodiment. In the second embodiment, cache update constraint processing and the timely cache update processing can be executed as the overall processing.

The cache update constraint registration processing in the second embodiment is processing executed by the data processing system 4 when the DB administrator 2 gives the DB information 101 of the database 210 and the cache update constraint 102 to the cache DB management device 500 so that the developer 3 can access the database 210 on the data analysis device 600. The processing procedure of the cache update constraint registration processing in the second embodiment may be considered to be similar to the processing illustrated in FIG. 3 in the first embodiment except that the rendering unit 170 is replaced with the management rendering unit 510. However, in the cache update constraint registration processing in the second embodiment, a constraint regarding the number of times of requests can be added to the cache update constraint 102.

Figure 24:
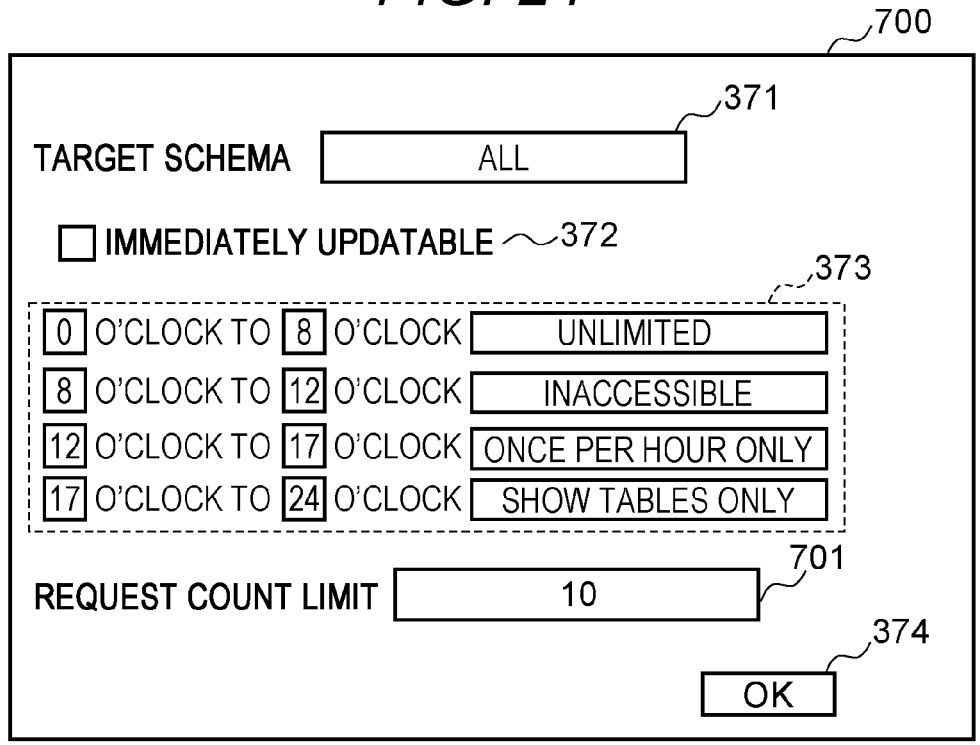
FIG. 24 is a view illustrating an example of a cache update constraint input screen.

FIG. 24 is a view illustrating an example of a cache update constraint input screen. A cache update constraint input screen 700 illustrated in FIG. 24 is a screen for inputting the cache update constraint 102 imposed on the database 210 to be registered in the second embodiment. An entry field 701 of the limit of the number of times of requests is added as compared with the cache update constraint input screen 370 in the first embodiment illustrated in FIG. 19. By entering a desired designated number of times into the entry field 701 and performing a pressing operation on the OK button 374, the DB administrator 2 can designate the number of times the data update request from the developer 3 (in other words, the cache update request from the data analysis device 600) is made to execute the cache update processing.

Figure 25:
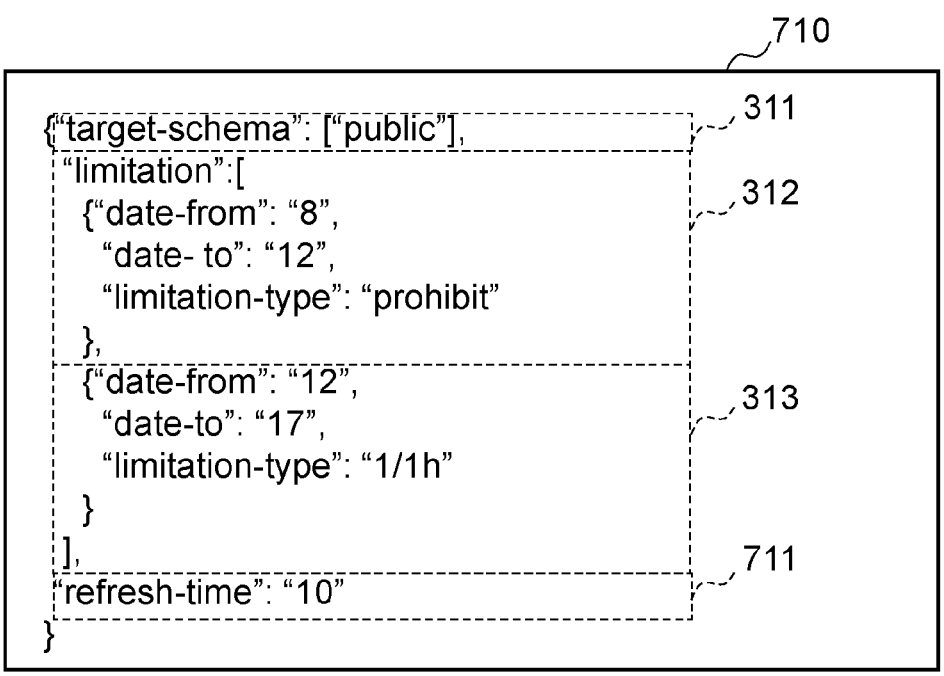
FIG. 25 is a view illustrating an example of the cache update constraint 102.

FIG. 25 is a view illustrating an example of the cache update constraint 102. A cache update constraint 710 illustrated in FIG. 25 illustrates an example of a code of the cache update constraint 102 when stored in the cache update constraint information 162 in the second embodiment, and similarly to the cache update constraint 310 in the first embodiment illustrated in FIG. 8, describes the constraint of the cache update in the JSON format. Confirming the specific code of the cache update constraint 710, the codes 311, 312, and 313 are similar to those of the cache update constraint 310 of FIG. 8, and description thereof is omitted. In the cache update constraint 710 of FIG. 25, a code 711 regarding the number of times of update requests describes, as a constraint, execution of the cache update processing when there are update requests for "10 times".

The timely cache update processing in the second embodiment is processing executed by the data processing system 4 when the developer 3 specifies the input database (the database 210) during use of the analysis flow design function 131 on the data analysis device 600, and cache update of the analysis part cache 150 is requested by the data update request by specification of the input DB.

Figure 26:
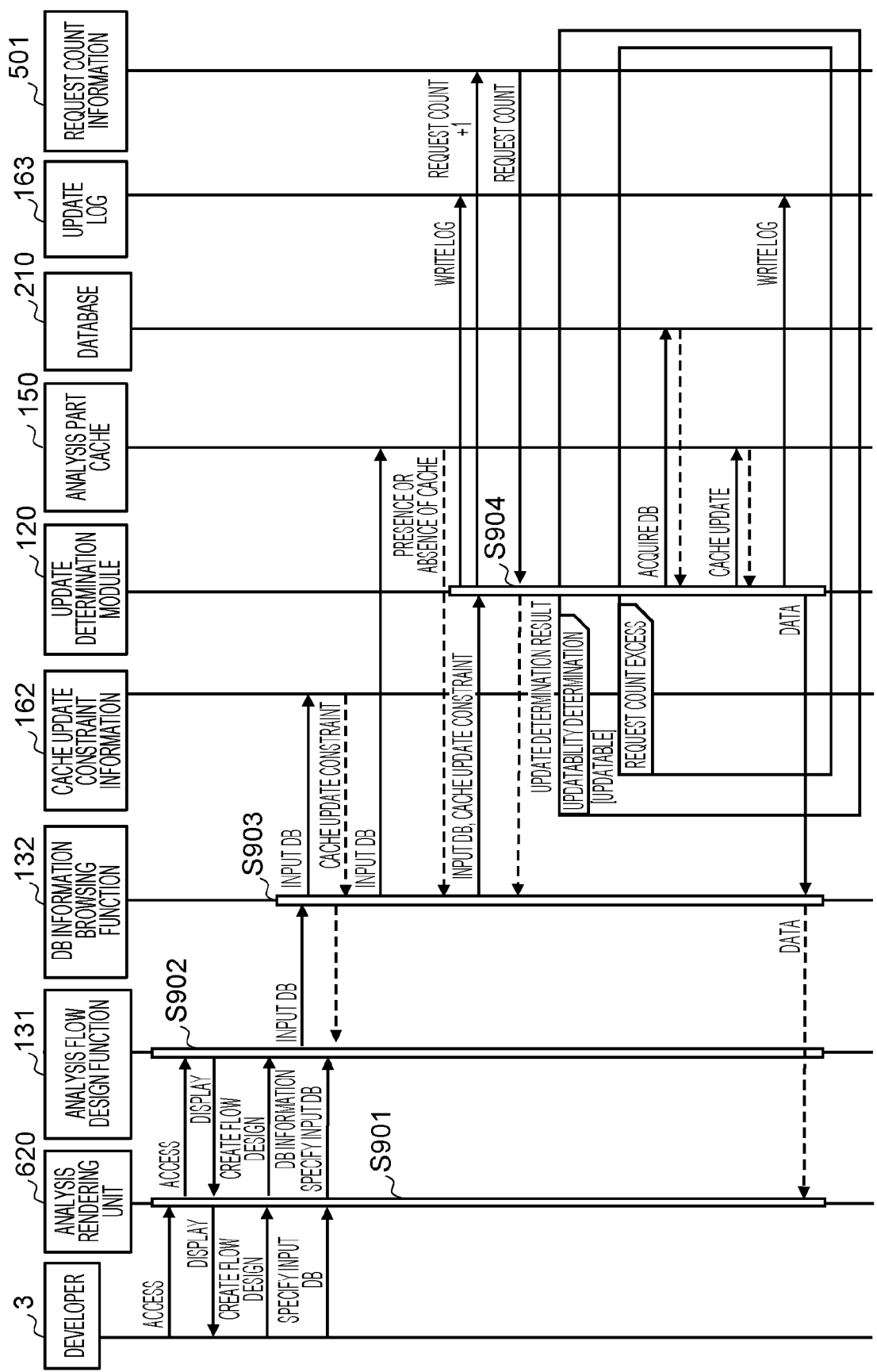
FIG. 26 is a sequence diagram illustrating a procedure example of timely cache update processing.

FIG. 26 is a sequence diagram illustrating a procedure example of the timely cache update processing. As described above, since the number of times of update requests is designated by the cache update constraint 102 in the second embodiment, unlike the arbitrary cache update processing (see FIG. 4) in the first embodiment, the timely cache update processing illustrated in FIG. 26 can execute the cache update of the analysis part cache 150 only under the constraint of the cache update constraint including the number of times of update requests.

As a difference from FIG. 4, in FIG. 26, the rendering unit 170 is replaced with an analysis rendering unit 620 as a processing subject, and the request count information 501 is added as a reference destination. In FIG. 26, as processing by each processing subject, the analysis rendering unit 620 executes the processing of step S901, the analysis flow design function 131 executes the processing of step S902, the DB information browsing function 132 executes the processing of step S903, and the update determination module 120 executes the processing of step S904. However, the processing of step S902 is similar to the processing of step S202 in FIG. 4, and a detailed description thereof will be omitted.

Step S901 illustrated in FIG. 26 is processing by the analysis rendering unit 620. As a difference from the processing of step S201 by the rendering unit 170 in FIG. 4, in step S901, the analysis rendering unit 620 does not receive the information on update button display from the DB information browsing function 132 and does not display the update button. Therefore, the analysis rendering unit 620 does not detect that the developer 3 has performed a pressing operation on the update button 171, and does not pass the cache update target to the DB information browsing function 132. The other processing is similar to the processing of step S201 in FIG. 4.

Step S902 illustrated in FIG. 26 is processing by the analysis flow design function 131. The processing of step S902 is similar to the processing of step S202 in FIG. 4, and the description thereof will be omitted.

Step S903 illustrated in FIG. 26 is processing by the DB information browsing function 132. In step S903, when receiving the connection information related to the input DB from the analysis flow design function 131, the DB information browsing function 132 transmits the input DB to the cache update constraint information 162 and acquires cache update constraint having been set for the target database 210. The cache update constraint acquired at this time also includes the number of times of update requests. Thereafter, the DB information browsing function 132 confirms whether or not the cache of the target database 210 exists in the analysis part cache 150 by transmitting the input DB to the analysis part cache 150, and transmits the DB information of the input DB and the cache update constraint to the update determination module 120. Subsequently, when the cache update is performed and the updated data of the database 210 is received from the update determination module 120, the DB information browsing function 132 transmits the received data to the analysis rendering unit 620.

Step S904 illustrated in FIG. 26 is processing by the update determination module 120. In step S904, when receiving the information (the input DB and the cache update constraint) on the database from the DB information browsing function 132, the update determination module 120 determines, based on the cache update constraint, whether the update of the cache is possible with respect to the database 210 indicated by the input DB, writes the determination result (update determination result) into the update log 163, and increases the current number of times of requests to be held in the request count information 501 by "1". Subsequently, the update determination module 120 acquires the increased number of times of requests from the request count information 501, and acquires the target database 210 and updates the analysis part cache 150 if, based on the cache update constraint, the update is possible, and the number of times of requests is equal to or more than the designated limit of the number of times of requests. Then, the update determination module 120 writes these update results into the update log 163 and transmits the updated cache data to the DB information browsing function 132.

(2-3) Individual Processing

Hereinafter, individual processing executed by each function, module, and the like in the overall processing in the second embodiment will be described in detail with a focus on processing different from that in the first embodiment.

Figure 27:
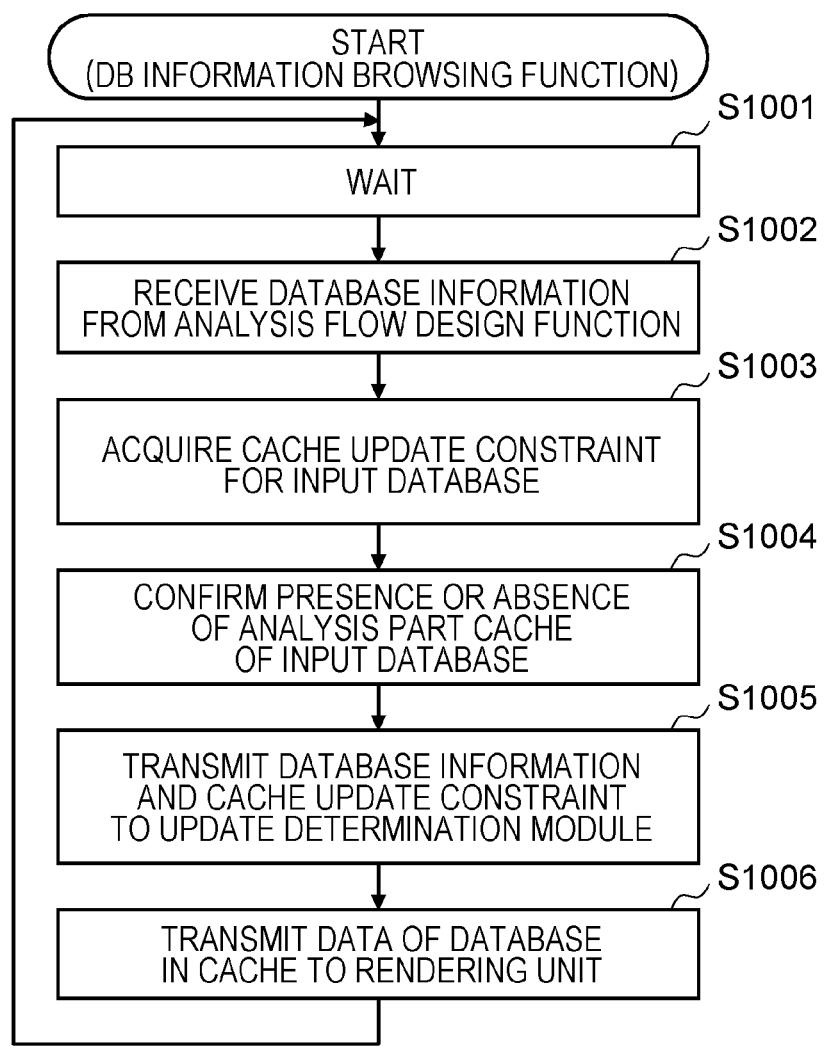
FIG. 27 is a flowchart illustrating a processing procedure example of processing by the DB information browsing function 132.

FIG. 27 is a flowchart illustrating a processing procedure example of processing by the DB information browsing function 132. The processing illustrated in FIG. 27 corresponds to the processing of step S903 in FIG. 26. As compared with the processing by the DB information browsing function 132 in the first embodiment (see FIG. 14), the processing of steps S1001 to S1005 in FIG. 27 is similar to the processing of steps S701 to S705 illustrated in FIG. 14. Then, in FIG. 27, there is no processing corresponding to the processing of steps S706 to S709 of FIG. 14, and the processing of step S1006 (corresponding to step S710 of FIG. 14) is performed after step S1005.

Figure 28:
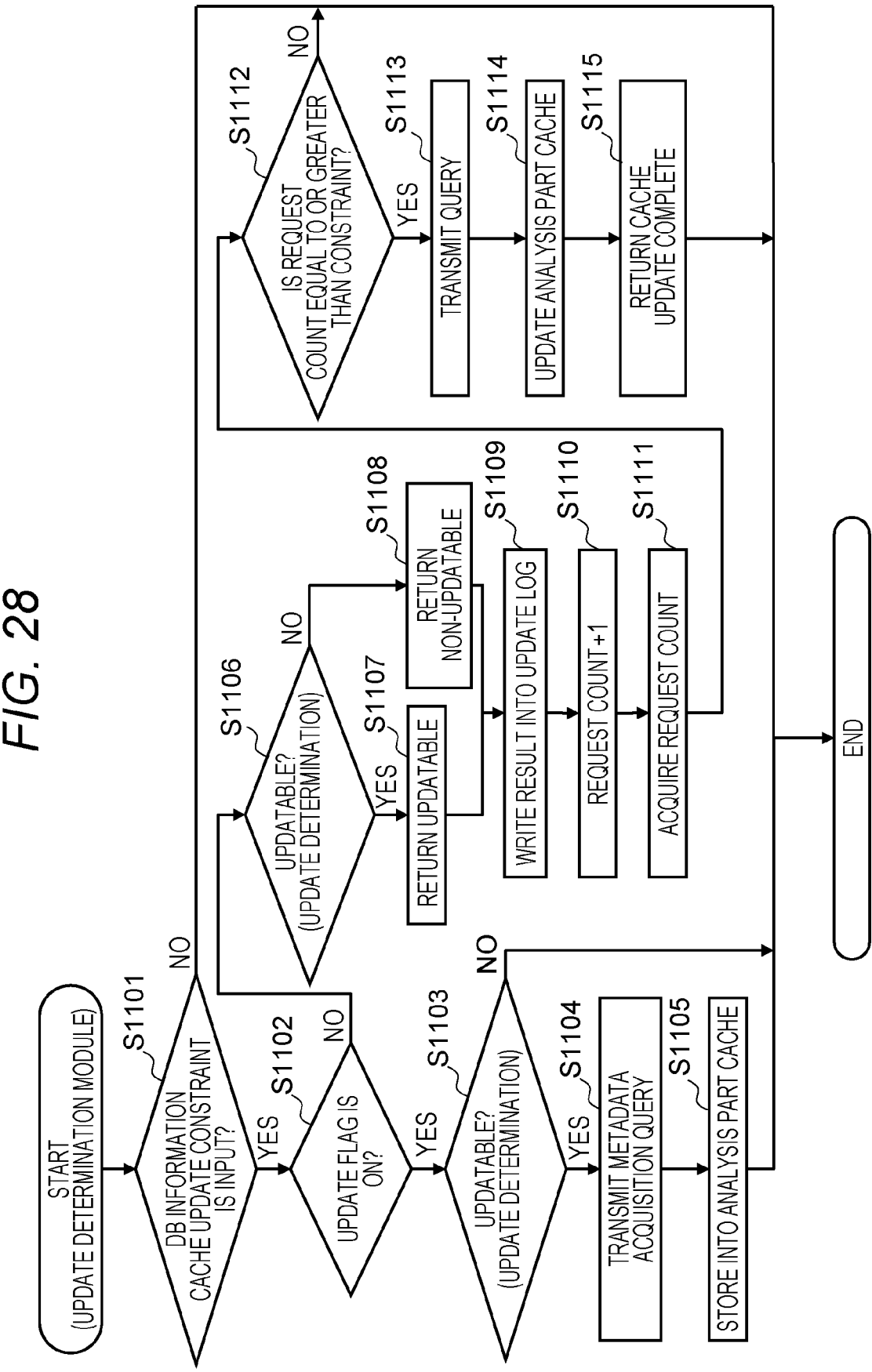
FIG. 28 is a flowchart illustrating a processing procedure example of processing by the update determination module 120.

FIG. 28 is a flowchart illustrating a processing procedure example of processing by the update determination module 120. The processing illustrated in FIG. 28 corresponds to the processing of step S104 in FIG. 3 and the processing of step S904 in FIG. 26. As compared with the processing by the update determination module 120 in the first embodiment (see FIG. 9), in FIG. 28, if it is determined as YES in step S1101 (similar to step S501 in FIG. 9), up to the subsequent processing of steps S1102 to S1109 is similar to the processing of steps S502 to S509 in FIG. 9, and then the processing of steps S1110 to S1115 is newly added. In FIG. 28, if it is determined as NO in step S1101 (similar to step S501 in FIG. 9), the processing in and after step S510 in FIG. 9 where the cache update query is determined is not executed, and the processing ends as it is.

The processing of steps S1110 to S1115 newly added in FIG. 28 will be described. First, the update determination module 120 adds the number of times of requests of "1" to the request count information 501 held in the cache DB management device 500 (step S1110). Next, the update determination module 120 acquires the current number of times of requests (i.e., the number of times of requests after the addition in step S1110) held in the cache DB management device 500 (step S1111).

Then, the update determination module 120 compares the current number of times of requests acquired in step S1111 with the limit of the number of times of requests designated in the cache update constraint imposed on the target database, and determines whether or not the current number of times of requests is equal to or more than the limit of the number of times of requests (step S1112). If the current number of times of requests is equal to or more than the limit of the number of times of requests in step S1111 (YES in step S1111), the process proceeds to step S1113. If the current number of times of requests is less than the limit of the number of times of requests (NO in step S1111), the processing ends.

When the process proceeds to step S1113, the update determination module 120 transmits a cache update query to the database 210 and receives the result. Then, the update determination module 120 updates the analysis part cache 150 with the result received in step S1113 (step S1114).

Thereafter, the update determination module 120 transmits the update result (that the cache update is completed) in step S1114 to the DB information browsing function 132 (step S1115), and ends the processing.

Figure 29:
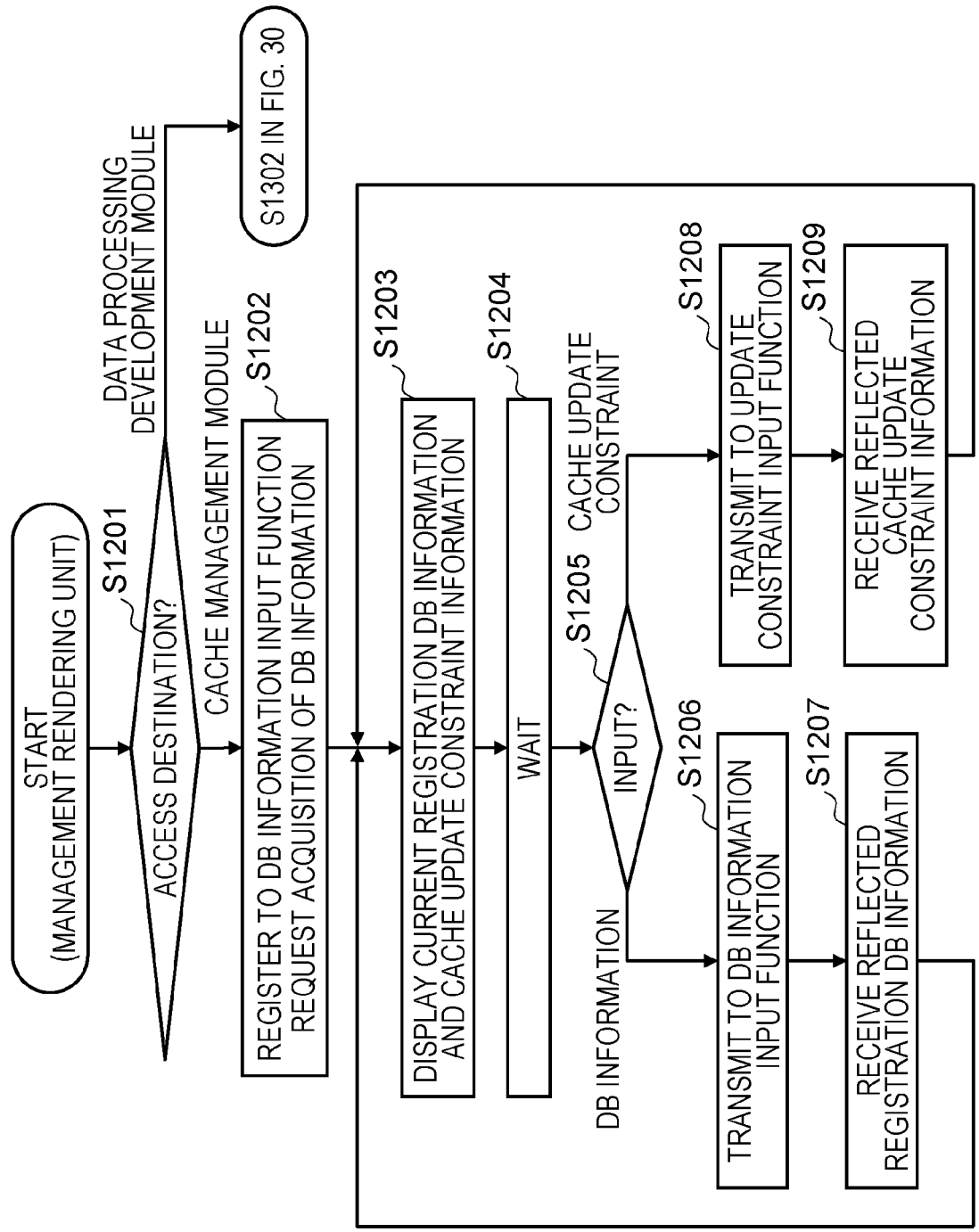
FIG. 29 is a flowchart illustrating a processing procedure example of processing by a management rendering unit 510.

FIG. 29 is a flowchart illustrating a processing procedure example of processing by the management rendering unit 510. The processing illustrated in FIG. 29 is similar to the processing by the rendering unit 170 when being accessed to the cache management module 110 in the first embodiment, and specifically corresponds to the processing of step S101 in FIG. 3 (FIG. 15 as detailed individual processing).

In FIG. 29, it is determined in step S1201 whether the access destination from the user is the cache management module 110 or the data processing development module 130. However, since the user who accesses the management rendering unit 510 of the cache DB management device 500 is the DB administrator 2, the cache management module 110 is the access destination, and the management rendering unit 510 executes the processing in and after step S1202. Specifically, the processing of steps S1202 to S1209 corresponds to the processing of steps S802 to S809 in FIG. 15, respectively.

Figure 30:
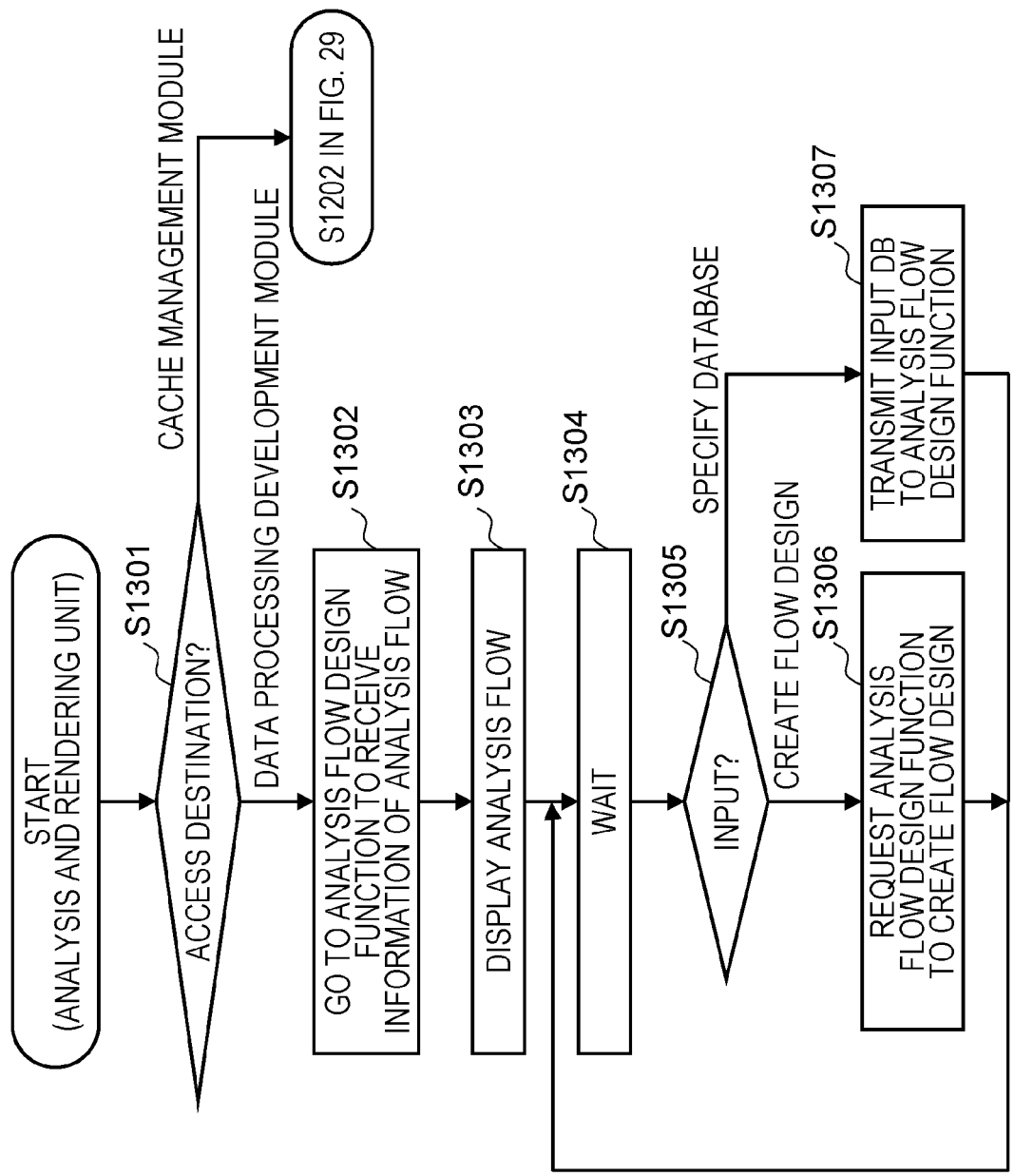
FIG. 30 is a flowchart illustrating a processing procedure example of processing by an analysis rendering unit 620.

FIG. 30 is a flowchart illustrating a processing procedure example of processing by the analysis rendering unit 620. The processing illustrated in FIG. 30 corresponds to the processing by the rendering unit 170 when accessed to the data processing development module 130 in the first embodiment, and specifically corresponds to a part of the processing of step S201 in FIG. 4 (FIG. 16 as detailed individual processing).

In FIG. 30, it is determined in step S1301 whether the access destination from the user is the cache management module 110 or the data processing development module 130. However, since the user who accesses the analysis rendering unit 620 of the data analysis device 600 is basically the developer 3, the data processing development module 130 is the access destination, and the analysis rendering unit 620 executes the processing in and after step S1302. Specifically, the processing of steps S1302 to S1307 corresponds to the processing of steps S810 to S815 in FIG. 16, respectively. However, in the second embodiment, since the cache update button is not displayed in the analysis rendering unit 620 of each data analysis device 600, the analysis rendering unit 620 does not execute the processing corresponding to steps S816 to S821 of FIG. 16, and performs only the rendering processing related to the data processing development module 130.

By performing the processing as described above, the data processing system 4 includes the plurality of data analysis devices 600, and even when each data analysis device 600 is used by the plurality of developers 3, the cache used for each data analysis is integrated and managed in the analysis part cache 150 in the cache DB management device 500, and the cache update is permitted only under the cache update constraint. Therefore, even if a predetermined data operation (for example, specification of the input DB) accompanied by a data update request to the analysis part cache 150 is performed from the developer 3 who uses the plurality of data analysis devices 600, an increase in access to the core database (database 210) can be limited.

From the user's viewpoint, in the data processing system 4 according to the present embodiment, the function that can impose a cache update constraint on the cache update of the analysis part cache 150 used in the development phase of the data analysis is implemented in a mode including a constraint condition by the number of times of update requests by data from the DB administrator 2. From the developer 3 who uses the plurality of data analysis devices 600, by voluntarily performing a predetermined data operation (for example, specification of the input DB) accompanied by a data update request to the analysis part cache 150, it is possible to request the cache update. When the data update is requested from the developer 3, the cache update of the target data is performed only when the update is possible under the determination whether the update is possible based on the update constraint (including the update constraint regarding the number of times of update requests) imposed on the target data. Therefore, in order to reduce the access load on the database 210, if the number of times of update requests does not reach the designated condition, a situation in which the cache update of the target data is not immediately performed is likely to occur, but the cache update of the target data can be executed as desired by the developer 3 in a relatively early stage.

Figure 31:
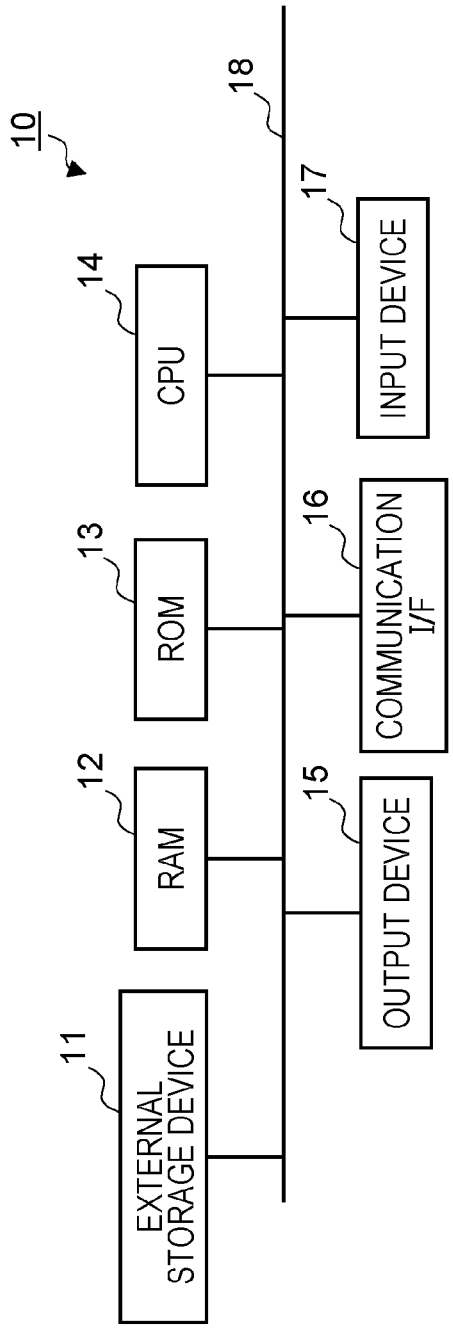
FIG. 31 is a block diagram illustrating a hardware configuration example of each device (computer device 10) constituting the data processing system 1 or 4 according to the first or second embodiment.

FIG. 31 is a block diagram illustrating a hardware configuration example of each device (the computer device 10) constituting the data processing system 1 or 4 according to the first or second embodiment. Specifically, the hardware configuration example illustrated in FIG. 31 can be implemented in the data processing device 100, the database device 200, the cache DB management device 500, and the data analysis device 600.

As illustrated in FIG. 31, the computer device 10 includes an external storage device 11, a random access memory (RAM) 12, a read only memory (ROM) 13, a central processing unit (CPU) 14, an output device 15, a communication IF 16, and an input device 17, and components are mutually connected via a bus 18.

The functions of each device constituting the data processing system 1 (the data processing system 4) may be implemented by, for example, the CPU 14 reading a program stored in the ROM 13 into the RAM 12 and executing the program in the computer device 10, a part or all of functions may be implemented by hardware such as a specially designed integrated circuit, or the functions may be implemented by combining software and hardware.

The external storage device 11 is, for example, a hard disk drive (HDD), a solid state drive (SSD), a flash memory, an optical storage device, or the like. The output device 15 has a function of outputting data, and outputs a screen related to the data processing device 100, the cache DB management device 500, or the data analysis device 600 with an output device such as a monitor or a printer. The communication IF 16 is used for connection between the data processing device 100 and the database device 200 in the data processing system 1 or connection among the cache DB management device 500, the data analysis device 600, and the database 210 (database device) in the data processing system 4. The input device 17 is a keyboard, a mouse, or the like that accepts an input operation by the user (the DB administrator 2 and the developer 3). In the first embodiment, for example, the input device 17 is used for an operation when the DB administrator 2 inputs the DB information 101 and the cache update constraint 102 into the data processing device 100, or when the developer 3 designs an analysis flow or specifies a database for the data processing development module 130.

Although the first and second embodiments have been described above as representative embodiments for carrying out the present invention, the present invention is not limited to the above-described embodiments, and various modifications are included. For example, the above-described embodiments have been described in detail for easy-to-understand explanation of the present invention, and are not necessarily limited to those including all the described configurations. It is possible to replace a part of the configuration of one embodiment with the configuration of another embodiment, and it is also possible to add the configuration of another embodiment to the configuration of one embodiment. Another configuration can be added to, deleted from, or replaced with a part of the configuration of each embodiment.

For example, in the data processing system 1 according to the first embodiment (or may be the data processing system 4 according to the second embodiment), the cache size of the analysis part cache 150 is finite, and if it is impossible to store all the data used by the data processing device 100 (the plurality of data analysis devices 600 in the second embodiment) into the cache, it is necessary to directly refer to the database 210 when accessing data that do not exist in the cache. Therefore, as a modification of each embodiment, in such a situation, for example, the update determination module 120 may be configured to perform cache data switching processing of preferentially storing data having a large number of reference times from the data processing device 100 (the data analysis devices 600) into the analysis part cache 150. The cache data switching processing will be described below with reference to FIG. 32.

Figure 32:
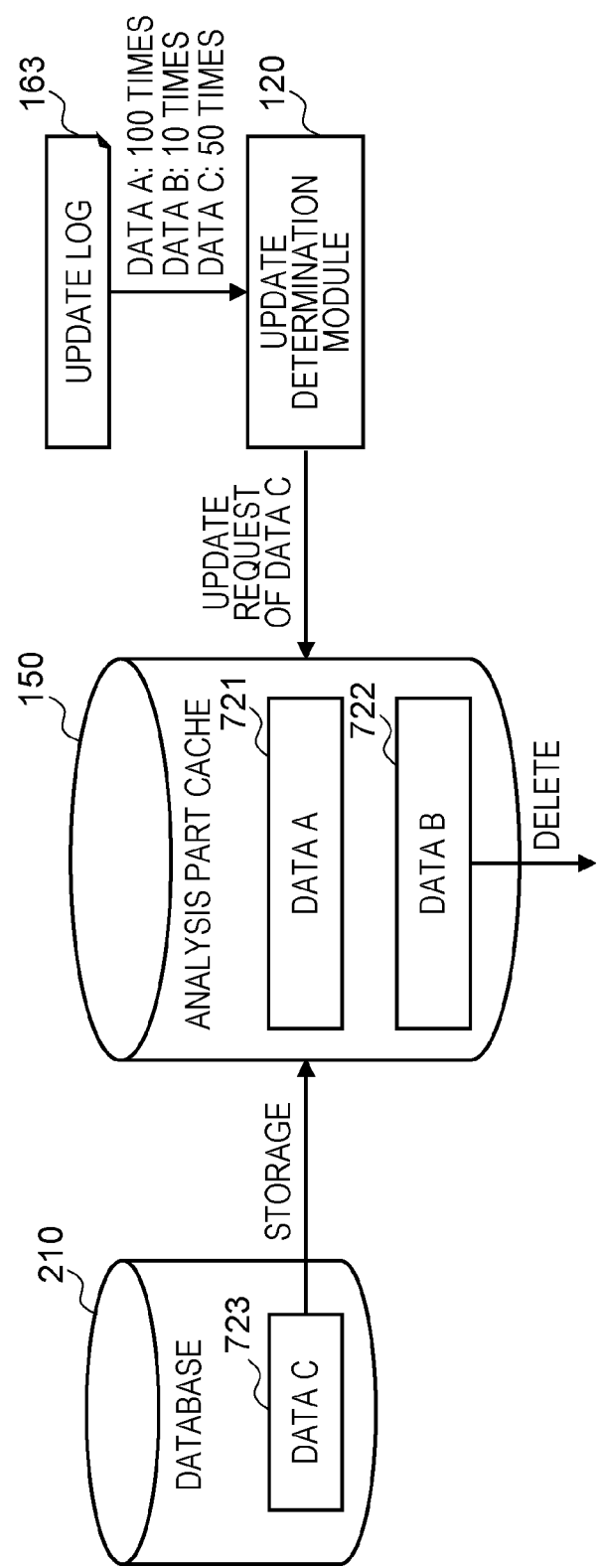
FIG. 32 is an image diagram for explaining cache data switching processing.

FIG. 32 is an image diagram for explaining the cache data switching processing. In the case of FIG. 32, it is assumed that the number of times of cache update request (the number of times of update request) is recorded in the update log 163 by data (by schema or by table). Specifically, it is recorded that the number of times of update requests is "100 times" and "10 times" for data A 721 and data B 722, respectively, whose caches are stored in the analysis part cache 150, and it is recorded that the number of times of update requests is "50 times" for data C 723 whose cache is not stored in the analysis part cache 150.

In FIG. 32, cache update is requested for the data C 723. Here, the update determination module 120 executes the cache data switching processing in the case where the update determination module 120 determines that the update of the cache is possible, the data capacity in the analysis part cache 150 is full (may be alternatively read as a case where a predetermined upper limit capacity or a capacity ratio is reached) at the stage of step S511 in FIG. 9 (step S1113 in FIG. 28 in the second embodiment) at which the query is transmitted to the database 210, and the previous cache of the data C 723 does not exist in the analysis part cache 150.

In the cache data switching processing, the update determination module 120 acquires the number of times of update requests by data from the update log 163, deletes data having a smaller number of times of update requests than that of the data requested to be updated and existing in the analysis part cache 150, and newly stores the data requested to be updated into the analysis part cache 150. Specifically, in the case of FIG. 32, the data B 722 (10 times), which has a smaller number of times of update requests than that of the data C 723 (50 times) and exists in the analysis part cache 150, is set as a deletion target. Note that the data A 721 (100 times) is not selected as a deletion target because the number of times of request updates is larger than that of the data C 723 (50 times), and the cache in the analysis part cache 150 is maintained.

In the present modification, by performing the cache data switching processing as described above, the data B having a relatively small number of times of update requests is deleted from the analysis part cache 150, and the data C having a relatively large number of times of update requests is stored into the analysis part cache 150. Therefore, while suppressing the cache update frequency of the analysis part cache 150, it is possible to preferentially cache data (schema or table) having a large number of reference times, and as a result, it is possible to reduce the number of times of directly reading data into the database 210. That is, by preferentially storing data having a large number of reference times from the data processing device 100 (the data analysis device 600) into the analysis part cache 150, the data processing system 1 (the data processing system 4) can reduce the number of times of directly referring to the database 210, and can reduce the access load.

Each figure that the above explanation referred to illustrates control lines and information lines that are considered to be necessary for explanation, and does not necessarily illustrate all control lines and information lines included in the product. In practice, almost all configurations may be considered to be interconnected.

What is claimed is:

1. A data processing system that is connected to a database and performs data analysis of the database, the data processing system comprising:
    an analysis part cache that caches data of the database referred to in a development phase of the data analysis;
    a data processing development module that is used by a developer of the data analysis and develops analysis processing for the data analysis;
    a data processing module that is used by the developer and performs data analysis by executing the analysis processing developed by the data processing development module;
    a cache management module that sets a cache update constraint that is input from an administrator of the database regarding a cache update from the database in the analysis part cache; and
    an update determination module that determines whether or not a cache update of the analysis part cache is possible based on the update constraint set by the cache management module, wherein
    when the cache update is requested from the data processing development module, the update determination module executes the requested cache update in a case where a cache update is allowed in the determination, by
        determining whether the data and the cache update constraint are input,
        on a condition that the data and the cache update constraint are input, determining whether an update flag is in a first state, on a condition that the update flag is in the first state, determining whether the analysis part cache can be updated based on the cache update constraint, and on a condition that the analysis part cache is updateable, transmitting an acquisition query to the database and receive a result of the acquisition query, and on a condition that the data and the cache update constraint are not input, determining whether a cache update query is input, on a condition that the cache update query is input, transmitting an input cache update query to the database and receive a result of the input cache update query, and updating the analysis part cache based on the result of the input cache update query.

2. The data processing system according to claim 1, further comprising:

a rendering unit that displays a screen for the developer, wherein when the update determination module determines that cache update of the analysis part cache is possible, the rendering unit displays, in a form operable by the developer, an update button for performing an operation of requesting the cache update.

3. The data processing system according to claim 1, wherein the cache management module can set the update constraint for the data held in the database in units of schema or in units of table.

4. The data processing system according to claim 1, wherein the cache management module can set a time or a frequency at which the cache update is permitted in the update constraint.

5. The data processing system according to claim 1 comprising:

a cache DB management device including the analysis part cache, the cache management module, and the update determination module, and used by the administrator; and a plurality of data analysis devices each having a data processing development module and the data processing module, and used by the developer, wherein in the cache DB management device, the analysis part cache integrally caches data of the database referred to from the plurality of data analysis devices.

6. The data processing system according to claim 5, wherein the cache DB management device further includes an update log that records a number of times of requests of the cache update from the plurality of data analysis devices, the cache management module designates a cumulative number of times of requests for the cache update as at least one of the update constraints, and when a predetermined data operation is performed by the developer in the data analysis device, the data processing development module requests the cache DB management device to update the cache for target data of the predetermined data operation, and based on the update constraint including designation of the cumulative number of times, the cache management module of the cache DB management device determines whether or not cache update of the target data in the analysis part cache is possible, and, if cache update is possible in the determination, executes the requested cache update.

7. The data processing system according to claim 1, wherein the cache management module includes a function of preferentially caching data having a large number of reference times into the analysis part cache.

8. A cache update control method by a data processing system that performs data analysis of a database, wherein the data processing system includes:

an analysis part cache that caches data of the database referred to in a development phase of the data analysis;

a data processing development module that is used by a developer of the data analysis and develops analysis processing for the data analysis;

a data processing module that is used by the developer and performs data analysis by executing the analysis processing developed by the data processing development module;

a cache management module that sets a cache update constraint that is input from an administrator of the database regarding a cache update from the database in the analysis part cache; and an update determination module that determines whether or not a cache update of the analysis part cache is possible based on the update constraint set by the cache management module, and when the cache update is requested from the data processing development module, the update determination module executes the requested cache update in a case where a cache update is allowed in the determination, by determining whether the data and the cache update constraint are input, on a condition that the data and the cache update constraint are input, determining whether an update flag is in a first state, on a condition that the update flag is in the first state, determining whether the analysis part cache can be updated based on the cache update constraint, and on a condition that the analysis part cache is updateable, transmitting an acquisition query to the database and receive a result of the acquisition query, and on a condition that the data and the cache update constraint are not input, determining whether a cache update query is input, on a condition that the cache update query is input, transmitting an input cache update query to the database and receive a result of the input cache update query, and updating the analysis part cache based on the result of the input cache update query.

9. The cache update control method according to claim 8, wherein the data processing system further includes a rendering unit that displays a screen for the developer, and when the update determination module determines that cache update of the analysis part cache is possible, the rendering unit displays, in a form operable by the developer, an update button for performing an operation of requesting the cache update.

* * * * *